US012582911B2

(12) United States Patent
Huang

(10) Patent No.: US 12,582,911 B2
(45) Date of Patent: Mar. 24, 2026

(54) DISPLAY METHOD AND APPARATUS FOR VIRTUAL VEHICLE, DEVICE, AND STORAGE MEDIUM

(71) Applicant: Tencent Technology (Shenzhen) Company Limited, Shenzhen (CN)

(72) Inventor: Xiaoquan Huang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 521 days.

(21) Appl. No.: 17/987,302

(22) Filed: Nov. 15, 2022

(65) Prior Publication Data

US 2023/0072503 A1    Mar. 9, 2023

Related U.S. Application Data

(63) Continuation of application No. PCT/CN2022/082663, filed on Mar. 24, 2022.

(30) Foreign Application Priority Data

Apr. 25, 2021    (CN) .......................... 202110450247.3

(51) Int. Cl.
*A63F 13/63* (2014.01)
*A63F 13/52* (2014.01)
(Continued)

(52) U.S. Cl.
CPC .............. *A63F 13/63* (2014.09); *A63F 13/52* (2014.09); *A63F 13/533* (2014.09); *A63F 13/57* (2014.09);
(Continued)

(58) Field of Classification Search
CPC ........ A63F 13/52; A63F 13/533; A63F 13/57; A63F 13/577; A63F 13/63; A63F 13/69;
(Continued)

(56) References Cited

U.S. PATENT DOCUMENTS 7,874,921 B2 * 1/2011 Baszucki ................ A63F 13/63
463/2
8,025,572 B2 * 9/2011 Spanton .................. A63F 13/12
715/752
(Continued)

FOREIGN PATENT DOCUMENTS

CN        110681158 A    1/2020
CN        111603766 A    9/2020
(Continued)

OTHER PUBLICATIONS

International Search Report and Written Opinion in PCT/CN2022/082663, mailed Jun. 22, 2022, 12 pages.
(Continued)

*Primary Examiner* — William H McCulloch, Jr.
(74) *Attorney, Agent, or Firm* — ArentFox Schiff LLP

(57) ABSTRACT

A display method for a virtual vehicle is provided. In the method, whether a controlled virtual object has obtained each of a plurality of virtual parts of the virtual vehicle is determined. A graphical element that is associated with the virtual vehicle is displayed based on the plurality of virtual parts being obtained by the controlled virtual object. The virtual vehicle is displayed in a virtual scene of the controlled virtual object in response to a user selection of the graphical element that is associated with the virtual vehicle. Apparatus and non-transitory computer-readable storage medium counterpart embodiments are also contemplated.

20 Claims, 11 Drawing Sheets

(51) Int. Cl.

| | | |
|---|---|---|
| *A63F 13/533* | (2014.01) | |
| *A63F 13/57* | (2014.01) | |
| *A63F 13/577* | (2014.01) | |
| *A63F 13/69* | (2014.01) | |
| *A63F 13/837* | (2014.01) | |

(52) U.S. Cl.
CPC ............ *A63F 13/577* (2014.09); *A63F 13/69* (2014.09); *A63F 13/837* (2014.09); *A63F 2300/308* (2013.01); *A63F 2300/8076* (2013.01)

(58) Field of Classification Search
CPC ............. A63F 13/837; A63F 2300/308; A63F 2300/8076
See application file for complete search history.

(56) References Cited

U.S. PATENT DOCUMENTS

| | | | | |
|---|---|---|---|---|
| 8,277,318 | B2 * | 10/2012 | Baszucki ................. | A63F 13/63 |
| | | | | 463/31 |
| 9,430,897 | B2 * | 8/2016 | Yates ....................... | A63F 13/60 |
| 10,561,950 | B2 * | 2/2020 | Martin .................... | A63F 13/69 |
| 11,769,297 | B2 * | 9/2023 | Mizerski ................. | G06T 13/00 |
| | | | | 345/420 |
| 12,285,680 | B2 * | 4/2025 | Wang ...................... | A63F 13/57 |
| 2004/0043806 | A1 * | 3/2004 | Kirby ...................... | A63F 13/65 |
| | | | | 463/6 |
| 2005/0033601 | A1 * | 2/2005 | Kirby .................... | A63F 13/335 |
| | | | | 463/6 |
| 2005/0287925 | A1 * | 12/2005 | Proch ..................... | G06Q 30/06 |
| | | | | 446/470 |
| 2006/0035692 | A1 * | 2/2006 | Kirby ...................... | A63F 13/65 |
| | | | | 463/6 |
| 2006/0258447 | A1 * | 11/2006 | Baszucki .............. | A63F 13/335 |
| | | | | 463/31 |
| 2007/0117635 | A1 * | 5/2007 | Spanton .................. | A63F 13/86 |
| | | | | 463/43 |
| 2007/0191101 | A1 * | 8/2007 | Coliz ...................... | A63F 13/30 |
| | | | | 463/42 |
| 2007/0191102 | A1 * | 8/2007 | Coliz .................... | A63F 13/798 |
| | | | | 463/42 |
| 2009/0327723 | A1 * | 12/2009 | Yates ....................... | A63F 13/57 |
| | | | | 713/168 |
| 2011/0087479 | A1 * | 4/2011 | Baszucki ................ | A63F 13/63 |
| | | | | 703/22 |
| 2012/0129597 | A1 * | 5/2012 | Baszucki .............. | A63F 13/803 |
| | | | | 463/31 |
| 2016/0144283 | A1 * | 5/2016 | Martin ...................... | A63F 9/16 |
| | | | | 463/29 |
| 2016/0361628 | A1 * | 12/2016 | Linden .................. | A63F 13/213 |
| 2016/0361642 | A1 * | 12/2016 | Linden ...................... | A63F 1/02 |
| 2022/0207826 | A1 * | 6/2022 | Mizerski ................. | A63F 13/57 |
| 2022/0331694 | A1 * | 10/2022 | Wang ...................... | A63F 13/52 |
| 2023/0072503 | A1 * | 3/2023 | Huang .................. | A63F 13/577 |
| 2023/0082510 | A1 * | 3/2023 | Wang ................. | A63F 13/5375 |
| | | | | 463/6 |

FOREIGN PATENT DOCUMENTS

| | | |
|---|---|---|
| CN | 111672101 A | 9/2020 |
| CN | 112090083 A | 12/2020 |
| CN | 112121433 A | 12/2020 |
| CN | 113144597 A | 7/2021 |
| WO | 2018017626 A2 | 1/2018 |

OTHER PUBLICATIONS

Office Action in CN202110450247.3, mailed on Oct. 21, 2022, 19 pages.

Bilibili, "[Call of Duty mobile game] Want to experience the thrill of tanks fighting against the bomb? Armor Offensive is Coming!", Feb. 12, 2021, https://www.bilibili.com/video/BV1XA411T72w?p=6&vd_source=76d3264acb028cc08fccd0a145e89a77, 6 pages.

* cited by examiner

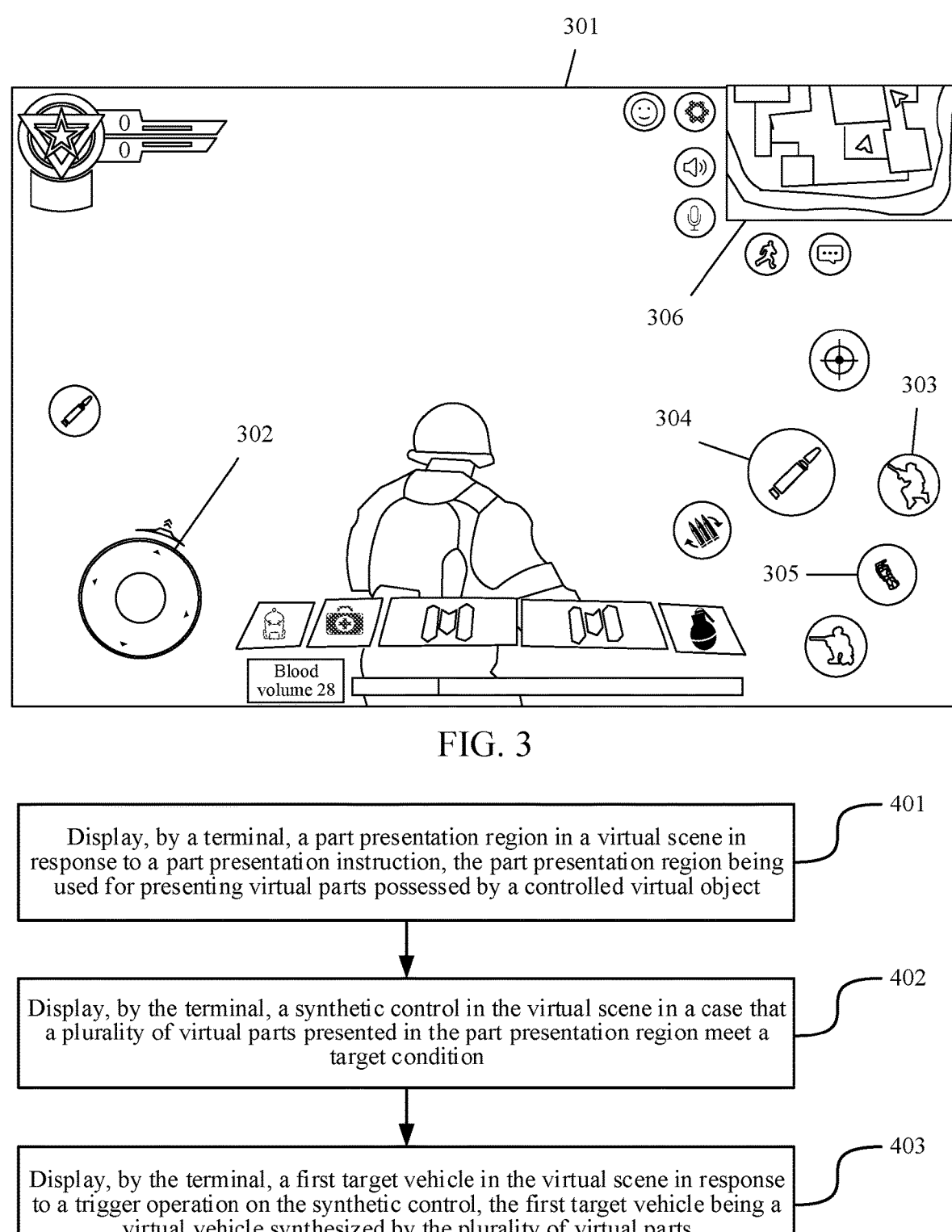

Display, by a terminal, a part presentation region in a virtual scene in response to a part presentation instruction, the part presentation region being used for presenting virtual parts possessed by a controlled virtual object

402

Display, by the terminal, a synthetic control in the virtual scene in a case that a plurality of virtual parts presented in the part presentation region meet a target condition

403

Display, by the terminal, a first target vehicle in the virtual scene in response to a trigger operation on the synthetic control, the first target vehicle being a virtual vehicle synthesized by the plurality of virtual parts

FIG. 4

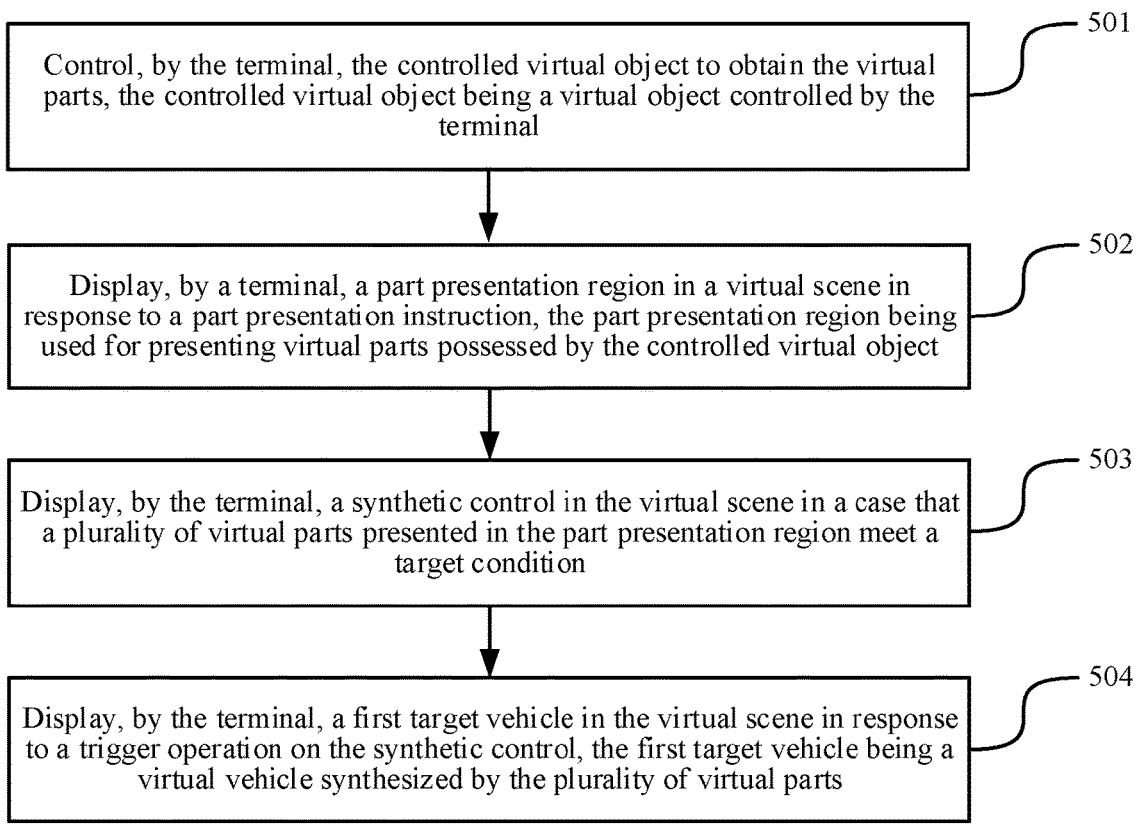

Control, by the terminal, the controlled virtual object to obtain the virtual parts, the controlled virtual object being a virtual object controlled by the terminal ⌐ 501

Display, by a terminal, a part presentation region in a virtual scene in response to a part presentation instruction, the part presentation region being used for presenting virtual parts possessed by the controlled virtual object ⌐ 502

Display, by the terminal, a synthetic control in the virtual scene in a case that a plurality of virtual parts presented in the part presentation region meet a target condition ⌐ 503

Display, by the terminal, a first target vehicle in the virtual scene in response to a trigger operation on the synthetic control, the first target vehicle being a virtual vehicle synthesized by the plurality of virtual parts ⌐ 504

FIG. 5

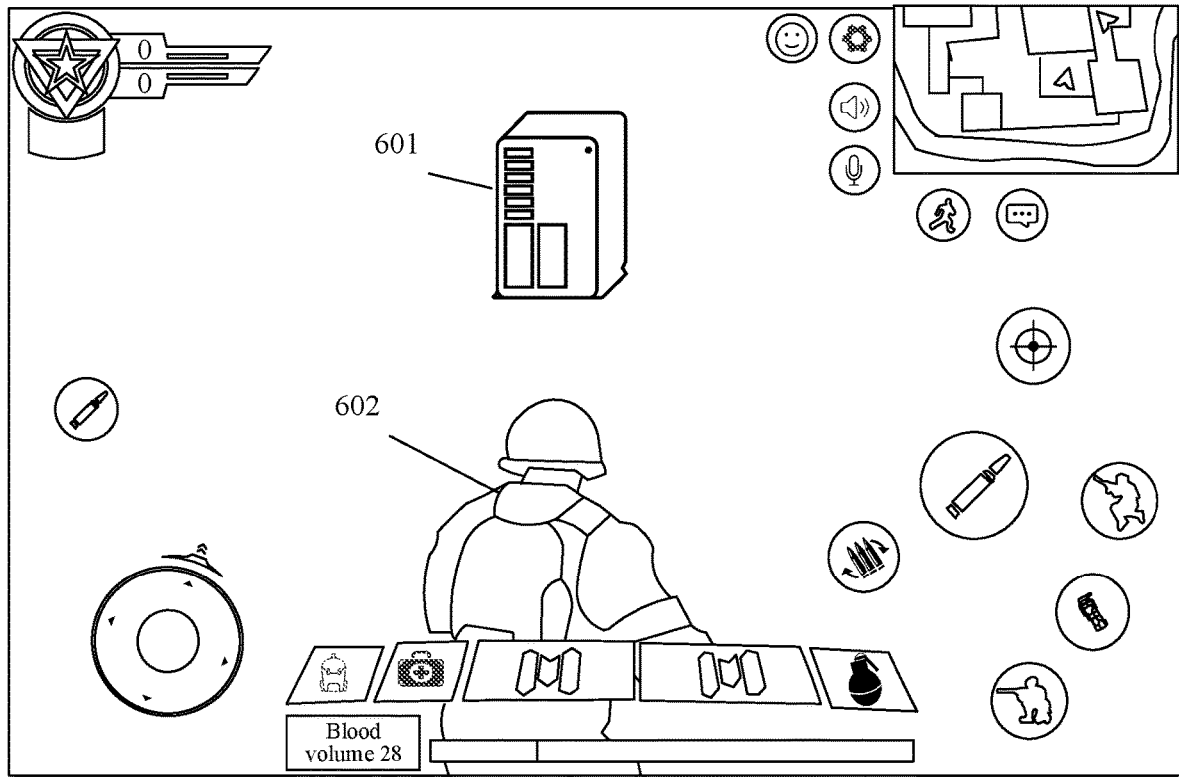

601

602

Blood volume 28

FIG. 6

DISPLAY METHOD AND APPARATUS FOR VIRTUAL VEHICLE, DEVICE, AND STORAGE MEDIUM

RELATED APPLICATIONS

The present application is a continuation of International Application No. PCT/CN2022/082663, entitled "VIRTUAL CARRIER DISPLAY METHOD AND APPARATUS, DEVICE, AND STORAGE MEDIUM" and filed on Mar. 24, 2022, which claims priority to Chinese Patent Application No. 202110450247.3, entitled "DISPLAY METHOD AND APPARATUS FOR VIRTUAL VEHICLE, DEVICE, AND STORAGE MEDIUM" and filed on Apr. 25, 2021. The entire disclosures of the prior applications are hereby incorporated by reference in their entirety.

FIELD OF THE TECHNOLOGY

This application relates to the field of computer technologies, including to a display method and a display apparatus for a virtual vehicle, a device, and a storage medium.

BACKGROUND OF THE DISCLOSURE

With the development of multimedia technologies and diversification of terminal functions, there are increasingly more types of games that can be played on a terminal. A shooting game is a relatively popular game. During the game, in addition to controlling a virtual object to use a variety of virtual firearms to attack virtual objects of other teams, a user can further control the virtual object to drive a virtual vehicle to move in a virtual scene.

SUMMARY

Embodiments of this disclosure provide a display method and a display apparatus for a virtual vehicle, a device, and a storage medium, which can improve the efficiency of human-machine interaction. Exemplary technical solutions are as follows.

According to an aspect, a display method for a virtual vehicle is provided. In the method, whether a controlled virtual object has obtained each of a plurality of virtual parts of the virtual vehicle is determined. A graphical element that is associated with the virtual vehicle is displayed based on the plurality of virtual parts being obtained by the controlled virtual object. The virtual vehicle is displayed in a virtual scene of the controlled virtual object in response to a user selection of the graphical element that is associated with the virtual vehicle.

According to an aspect, a display apparatus for a virtual vehicle is provided, the apparatus including processing circuitry. The processing circuitry is configured to determine whether a controlled virtual object has obtained each of a plurality of virtual parts of the virtual vehicle. The processing circuitry is configured to display a graphical element that is associated with the virtual vehicle based on the plurality of virtual parts being obtained by the controlled virtual object. The processing circuitry is configured to display the virtual vehicle in a virtual scene of the controlled virtual object in response to a user selection of the graphical element that is associated with the virtual vehicle.

According to an aspect, a computer device is provided, the computer device including one or more processors and one or more memories, the one or more memories storing at least one computer program, the computer program being loaded and executed by the one or more processors to implement the display method for a virtual vehicle.

According to an aspect, a non-transitory computer-readable storage medium is provided, the computer-readable storage medium storing instructions which when executed by a processor cause the processor to perform the display method for a virtual vehicle.

According to an aspect, a computer program product or a computer program is provided, the computer program product or the computer program including program code, the program code being stored in a computer-readable storage medium, a processor of a computer device reading the program code from the computer-readable storage medium, and the processor executing the program code to cause the computer device to perform the display method for a virtual vehicle.

According to technical solutions provided in embodiments of this disclosure, the part presentation region is displayed in the virtual scene, so that the virtual part already possessed by the controlled virtual object can be presented intuitively. Furthermore, the synthetic control is displayed in a case that the plurality of virtual parts in the part presentation region meet the target condition, that is, the virtual part already possessed by the controlled virtual object meets the target condition, so that by triggering the synthetic control, the plurality of virtual parts can be synthesized into a virtual vehicle, so that a terminal can display the virtual vehicle in the virtual scene. Since a presentation manner of the virtual part is intuitive and efficient, the efficiency of viewing the virtual part by a user can be improved. In addition, since the synthesis of the virtual vehicle can be implemented with only a click of the synthetic control, an operating manner for synthesizing the virtual vehicle is simple and efficient, that is, the efficiency of human-machine interaction is high.

BRIEF DESCRIPTION OF THE DRAWINGS

FIG. 3 is a schematic diagram of an interface according to an embodiment of this disclosure.

FIG. 4 is a flowchart of a display method for a virtual vehicle according to an embodiment of this disclosure.

FIG. 5 is a flowchart of a display method for a virtual vehicle according to an embodiment of this disclosure.

FIG. 6 is a schematic diagram of an interface according to an embodiment of this disclosure.

DESCRIPTION OF EMBODIMENTS

Figures 1, 2:
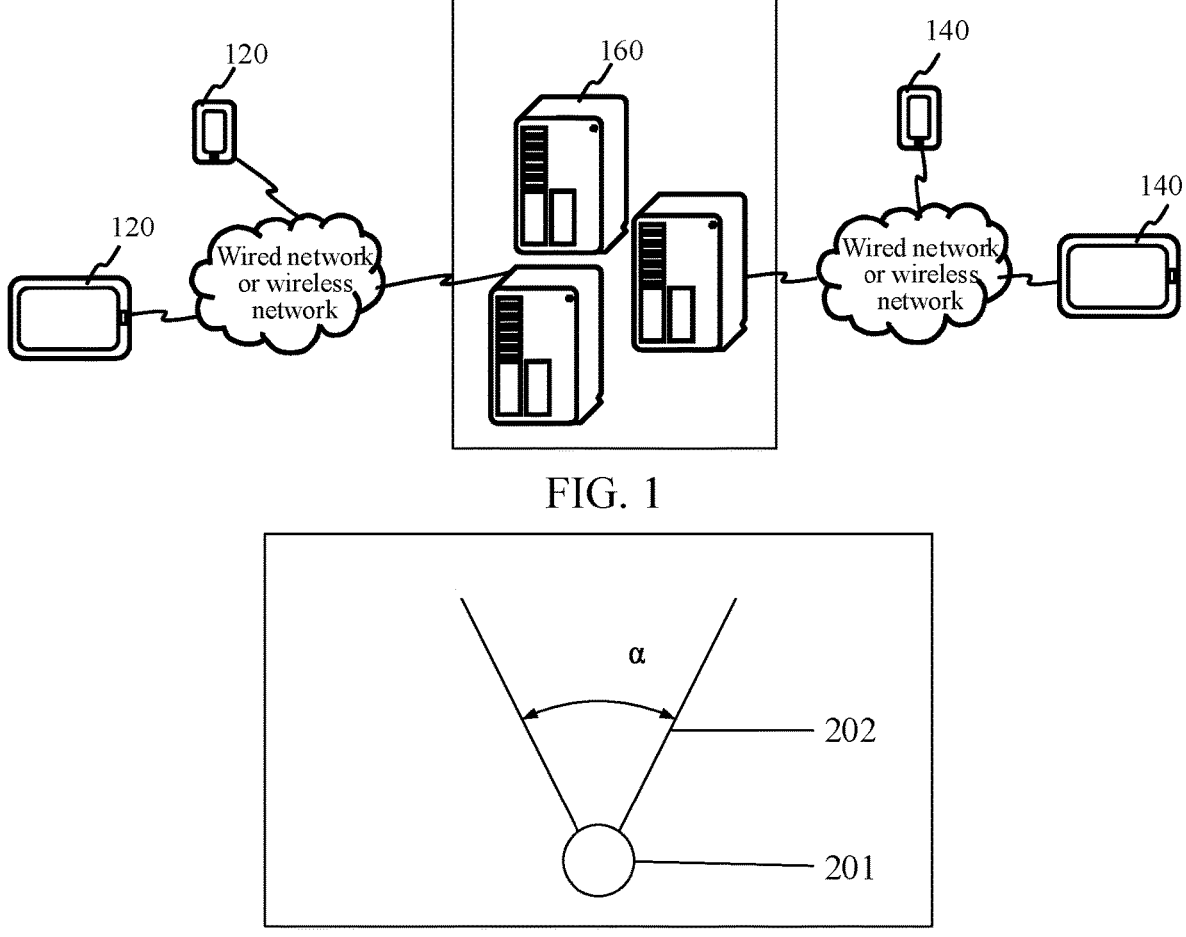
FIG. 1 is a schematic diagram of an implementation environment of a display method for a virtual vehicle according to an embodiment of this disclosure.
FIG. 2 is a schematic diagram of an interface according to an embodiment of this disclosure.

To make objectives, technical solutions, and advantages of this disclosure clearer, the following further describes implementations of this disclosure with reference to the accompanying drawings.

The terms "first", "second", and the like in this disclosure are used for distinguishing between same items or similar items of which effects and functions are basically the same. It should be understood that, the "first", "second", and "n-th" do not have a dependency relationship in logic or time sequence, and a quantity and an execution order thereof are not limited.

In this disclosure, "at least one" means one or more, and "a plurality of" means two or more. For example, a plurality of images means two or more images.

A virtual scene may include a virtual scene displayed (or provided) when an application is run on a terminal. The virtual scene may be of a simulation environment of a real world, a semi-simulation and semi-fiction virtual environment, or a pure fiction virtual environment. The virtual scene may be any one of a two-dimensional virtual scene, a 2.5-dimensional virtual scene, or a three-dimensional virtual scene. The dimension of the virtual scene is not defined in the embodiments of this disclosure. For example, the virtual scene includes the sky, the land, the ocean, and the like. The land includes environment elements such as the desert and a city. A user can control a virtual object to move in the virtual scene.

A virtual object may include a movable object in the virtual scene. The movable object may be a virtual character, a virtual animal, a cartoon character, or the like, for example, a character, an animal, a plant, an oil drum, a wall, or a stone displayed in the virtual scene. The virtual object may be a virtual image used for representing the user in the virtual scene. The virtual scene can include a plurality of virtual objects, and each virtual object has a shape and a volume in the virtual scene, and occupies some space in the virtual scene.

In some embodiments, the virtual object is a user role controlled by an operation on the client, or an artificial intelligence (AI) set in a virtual scene battle by training, or a non-player character (NPC) set in the virtual scene. In some embodiments, the virtual object is a virtual character competing in the virtual scene. In some embodiments, a quantity of virtual objects participating in the interaction in the virtual scene is preset or dynamically determined according to a quantity of clients participating in the interaction.

For example, in a shooting game, the user can control a virtual object to fall freely, glide, parachute, or the like in the sky of the virtual scene, or run, jump, crawl, walk in a stooped posture, or the like on the land, or can control a virtual object to swim, float, dive, or the like in the ocean.

The user can alternatively control a virtual object to ride a virtual vehicle to move in the virtual scene. For example, the virtual vehicle is a virtual car, a virtual aircraft, a virtual yacht, or the like. Herein, the scenes are used as examples for description, which is not specifically limited in the embodiments of this disclosure. The user can alternatively control the interaction (such as fighting) of a virtual object with other virtual objects through interactive props. For example, the interactive props are throwing interactive props such as hand grenades, cluster mines, and sticky hand grenades (referred to as "sticky mines"), or shooting interactive props such as machine guns, pistols, and rifles. This disclosure does not make specific limitations on the types of interactive props.

In the related technology, the virtual vehicles are often configured by a planning staff and set at different positions in the virtual scene. The user can control the virtual object to drive the virtual vehicle by controlling the virtual object to approach the virtual vehicle. In this case, the user cannot decide by himself a virtual vehicle he wants to use, and can only control the virtual object to drive a virtual vehicle encountered in the virtual scene, resulting in low efficiency of human-machine interaction.

FIG. 1 is a schematic diagram of an implementation environment of a display method for a virtual vehicle according to an embodiment of this disclosure. Referring to FIG. 1, the implementation environment includes: a first terminal 120, a second terminal 140, and a server 160.

An application supporting virtual scene display is installed and run on the first terminal 120. In some embodiments, the application is any one of a first-person shooting game (FPS), a third-person shooting game, a virtual reality application, a three-dimensional map program, or a multi-player gunfight survival game. The first terminal 120 is a terminal used by a first user, and the first user uses the first terminal 120 to cause a controlled virtual object in the virtual scene to perform a movement. The movement includes, but is not limited to, at least one of body posture adjustment, crawling, walking, running, cycling, jumping, driving, picking-up, shooting, attacking, and throwing. The controlled virtual object may be a first virtual character, such as a simulated character role or a cartoon character role.

The first terminal 120 and the second terminal 140 are connected to the server 160 by using a wireless network or a wired network.

An application supporting virtual scene display is installed and run on the second terminal 140. In some embodiments, the application is any one of a FPS, a third-person shooting game, a virtual reality application, a three-dimensional map program, or a multi-player gunfight survival game. The second terminal 140 is a terminal used by a second user, and the second user uses the second terminal 140 to cause another virtual object in the virtual scene to perform a movement. The movement includes, but is not limited to, at least one of body posture adjustment, crawling, walking, running, cycling, jumping, driving, picking-up, shooting, attacking, and throwing. The virtual object controlled by the second terminal 140 may be a second virtual character, such as a simulated character role or a cartoon character role.

In some embodiments, the virtual object controlled by the first terminal 120 and the virtual object controlled by the second terminal 140 are in a same virtual scene. In this case, the virtual object controlled by the first terminal 120 can interact with the virtual object controlled by the second terminal 140 in the virtual scene. In some embodiments, the virtual object controlled by the first terminal 120 is in a hostile relationship with the virtual object controlled by the second terminal 140. For example, the virtual object controlled by the first terminal 120 and the virtual object controlled by the second terminal 140 belong to different teams and organizations, and the virtual objects in the hostile relationship can interact with each other in a fighting manner by shooting each other on the land.

In some embodiments, the applications installed on the first terminal 120 and the second terminal 140 are the same, or the applications installed on the two terminals are the same type of applications on different operating system platforms. The first terminal 120 generally refers to one of a plurality of terminals, the second terminal 140 generally refers to one of a plurality of terminals, and this embodiment is described only by using the first terminal 120 and the second terminal 140 as an example. The first terminal 120 and the second terminal 140 are of the same or different device types. The device type includes at least one of a smartphone, a tablet computer, a laptop, and a desktop computer. For example, the first terminal 120 and the second terminal 140 are smartphones, or other handheld portable gaming devices, but are not limited thereto. The technical solutions provided in the embodiments of this disclosure can be applied to both the first terminal 120 and the second terminal 140, which is not limited in the embodiments of this disclosure. For the sake of clarity and conciseness, in the following description, a terminal may be used to refer to either the first terminal or the second terminal.

In some embodiments, the server 160 is an independent physical server, a server cluster or a distributed system formed by a plurality of physical servers, or a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. A quantity and a device type of the server are not limited in the embodiments of this disclosure.

In order to explain the technical solutions provided by embodiments of this disclosure more clearly, a virtual scene displayed by a computer device in this application is first introduced. Referring to FIG. 2, in order to make the shooting game more realistic, a game designer may design the virtual scene displayed by the computer device by referring to a way of human observation of a real world. A controlled virtual object 201 can observe a virtual scene in a region 202, and an image obtained by observing the region 202 at an angle of the controlled virtual object 201 is the virtual scene displayed by the computer device. The user can adjust a position of the controlled virtual object 201 to observe the virtual scene by adjusting an orientation of the controlled virtual object 201.

Using a smartphone as an example of the terminal, the virtual scene displayed by the computer device further displays a control configured to control the controlled virtual object to perform different actions. Referring to FIG. 3, a virtual joystick 302, a pose adjustment control 303, a shooting control 304, and a prop switching control 305 are displayed on a virtual scene 301 displayed by the computer device. The virtual joystick 302 is configured to control a movement direction of the controlled virtual object. The pose adjustment control 303 is configured to adjust a pose of the controlled virtual object, such as controlling the virtual object to perform actions such as squatting. The shooting control 304 is configured to control interactive props held by the controlled virtual object to fire virtual ammunition. The prop switching control 305 is configured to switch target props. In the embodiment of this disclosure, the user can control the controlled virtual object to throw the target prop through the shooting control 304. There is a small map 306 through which the user can observe positions of teammates and enemies in the virtual scene.

In the following description of technical solutions provided by this disclosure, the terminal is used as an execution subject, where the terminal is the first terminal 120 or the second terminal 140 in the above implementation environment. In other possible implementations, the technical solutions provided by this disclosure can be implemented through the interaction between the terminal and the server, and a type of the execution subject is not limited in the embodiments of this disclosure.

FIG. 4 is a flowchart of a display method for a virtual vehicle according to an embodiment of this disclosure. Referring to FIG. 4, the method includes the following steps.

In step 401, a part presentation region is displayed by a terminal in a virtual scene in response to a part presentation instruction, the part presentation region being used for presenting virtual parts possessed by a controlled virtual object. In an example, a virtual parts interface that is configured to display each of the plurality of virtual parts of the virtual vehicle obtained by the controlled virtual object is displayed.

The virtual parts are parts that the user uses to synthesize a virtual vehicle. There are several types of virtual vehicles, such as a virtual tank, a virtual car, a virtual motorcycle, and a virtual yacht. If the virtual vehicle is a virtual tank, the virtual parts are parts used for synthesizing the virtual tank.

In step 402, a synthetic control is displayed by the terminal in the virtual scene in a case that a plurality of virtual parts presented in the part presentation region meet a target condition. In an example, a graphical element that is associated with the virtual vehicle is displayed based on the plurality of virtual parts being obtained by the controlled virtual object. The display may be based on a determination of whether the controlled virtual object has obtained each of a plurality of virtual parts of the virtual vehicle.

The synthetic control is a button displayed on a screen, and the user can control the terminal to perform corresponding steps by a trigger operation on the button.

In step 403, a first target vehicle is displayed by the terminal in the virtual scene in response to a trigger operation on the synthetic control, the first target vehicle being a virtual vehicle synthesized by the plurality of virtual parts. In an example, the virtual vehicle is displayed in a virtual scene of the controlled virtual object in response to a user selection of the graphical element that is associated with the virtual vehicle.

The part presentation region is displayed in the virtual scene, so that the virtual part already possessed by the controlled virtual object can be presented intuitively. Furthermore, the synthetic control is displayed in a case that the plurality of virtual parts in the part presentation region meet the target condition, that is, the virtual part already possessed by the controlled virtual object meets the target condition, so that by triggering the synthetic control, the plurality of virtual parts can be synthesized into a virtual vehicle, so that a terminal can display the virtual vehicle in the virtual scene. Since a presentation manner of the virtual part is intuitive and efficient, the efficiency of viewing the virtual part by a user can be improved. In addition, since the synthesis of the virtual vehicle can be implemented with only a click of the synthetic control, an operating manner for synthesizing the virtual vehicle is simple and efficient, that is, the efficiency of human-machine interaction is high.

FIG. 5 is a flowchart of a display method for a virtual vehicle according to an embodiment of this disclosure. Referring to FIG. 5, the method includes the following steps.

In step 501, the controlled virtual object is controlled by a terminal to obtain the virtual parts, the controlled virtual object being a virtual object controlled by the terminal.

The virtual parts correspond to different portions of the virtual vehicle. For example, if the virtual vehicle is a virtual tank, then the virtual parts respectively correspond to a chassis, an engine, an armor, a barrel, and a secondary weapon of the virtual tank.

In some embodiments, a virtual vending machine is displayed in the virtual scene, and the virtual vending machine is used for providing the virtual parts. The terminal displays a part selection interface in the virtual scene in a case that a distance between the controlled virtual object and the virtual vending machine is less than or equal to a first distance threshold, the part selection interface displaying a plurality of to-be-selected virtual parts. The terminal determines, in response to a selection operation on any virtual part among the plurality of to-be-selected virtual parts, the virtual part as a virtual part possessed by the controlled virtual object. The first distance threshold may be set, for example by a technician, in accordance with the actual situation, such as set to 30 or 50, which is not limited in the embodiments of this disclosure.

That is, during the game, when the user finds the virtual vending machine in the virtual scene, the user can control the controlled virtual object to move towards the virtual vending machine. When the controlled virtual object is close to the virtual vending machine, the terminal can display the part selection interface in the virtual scene, and the user can select the virtual part for the controlled virtual object in the part selection interface.

In order to provide a clearer description of the above implementation, the above implementation will be described in two parts below.

The first part describes a manner in which the terminal displays the part selection interface in a case that the distance between the controlled virtual object and the virtual vending machine is less than or equal to the first distance threshold.

In some embodiments, a plurality of invisible collision detection boxes are disposed around the virtual vending machine, the collision detection boxes do not block the virtual objects moving in the virtual scene, and the longest distance between each collision detection box and the virtual vending machine is the first distance threshold. In a case that the controlled virtual object is in contact with any collision detection box, the terminal determines that the distance between the controlled virtual object and the virtual vending machine is less than or equal to the first distance threshold, and displays the part selection interface in the virtual scene. In some embodiments, the terminal determines the contact between the controlled virtual object and the collision detection box by determining whether there is an overlapping portion between a model of the controlled virtual object and the collision detection box. In a case that there is an overlapping portion between the model of the controlled virtual object and the collision detection box, the terminal determines that the controlled virtual object is in contact with the collision detection box.

In some embodiments, the terminal can divide the virtual scene into a plurality of invisible grids, and the controlled virtual object can span different grids when the controlled virtual object is continuously moving in the virtual scene. In a case that the controlled virtual object enters a grid where the virtual vending machine is located, the terminal can determine the distance between the controlled virtual object and the virtual vending machine in real time. In a case that the distance between the controlled virtual object and the virtual vending machine is less than or equal to the first distance threshold, the terminal displays the part selection interface in the virtual scene. In some embodiments, the terminal can determine the distance between the controlled virtual object and the virtual vending machine according to a coordinate of the controlled virtual object in the virtual scene and a coordinate of the virtual vending machine in the virtual scene. In this way, the terminal does not need to determine the distance between the controlled virtual object and the virtual vending machine in real time, but only needs to start detection when the controlled virtual object enters a specific grid, thereby reducing the consumption of computing resources of the terminal.

The second part describes a manner in which the terminal determines, in response to a selection operation on any virtual part among the plurality of to-be-selected virtual parts, the virtual part as a virtual part possessed by the controlled virtual object.

In some embodiments, in response to the selection operation on any virtual part displayed in the part selection interface, the terminal sends a part addition request to the server, the part addition request carrying an identifier of the selected virtual part and an identifier of the controlled virtual object. Upon receiving the part addition request, the server can obtain the identifier of the virtual part and the identifier of the controlled virtual object from the part addition request, to establish a binding relationship between the identifier of the virtual part and the identifier of the controlled virtual object. In other words, the server can determine the selected virtual part as the virtual part possessed by the controlled virtual object, and this process is referred to as adding the virtual part for the controlled virtual object.

The implementation is described below with reference to the accompanying drawings.

Figure 7:
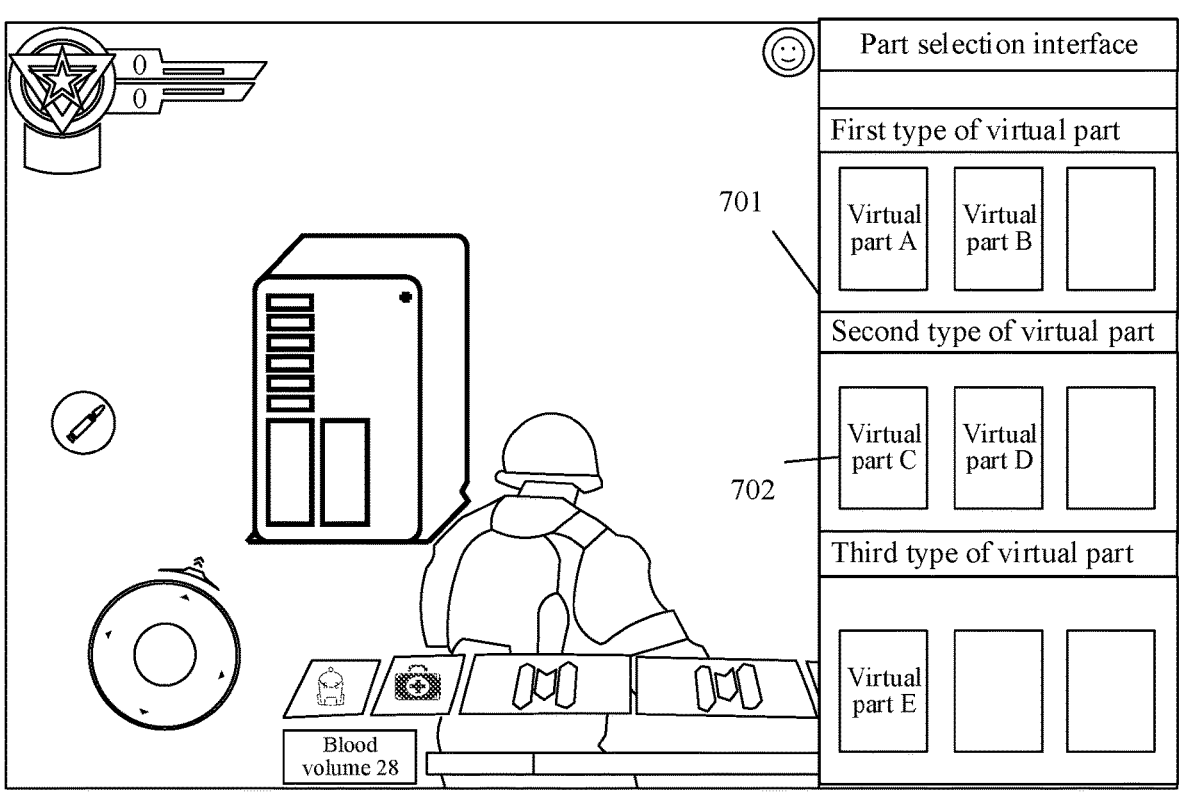
FIG. 7 is a schematic diagram of an interface according to an embodiment of this disclosure.

Referring to FIG. 6 and FIG. 7, a virtual vending machine 601 is displayed in the virtual scene. The terminal displays a part selection interface 701 in the virtual scene in a case that a distance between a controlled virtual object 602 and the virtual vending machine 601 is less than or equal to the first distance threshold, the part selection interface 701 displaying a plurality of to-be-selected virtual parts. The terminal determines, in response to a selection operation on any virtual part 702 among the plurality of to-be-selected virtual parts, the selected virtual part 702 as a virtual part possessed by the controlled virtual object 602.

Based on the above implementation, in some embodiments, in response to the selection operation on any virtual part among the plurality of to-be-selected virtual parts displayed in the part selection interface, the virtual part of the same part type possessed by the controlled virtual object is replaced with the selected virtual part.

In other words, for virtual parts of a plurality of part types, the controlled virtual object can only have one virtual part under each part type. If the controlled virtual object already has a virtual part of a certain part type, when the user selects the virtual part of the same part type for the controlled virtual object in the part selection interface, the virtual part originally possessed by the controlled virtual object is replaced by the virtual part of the same part type. In some embodiments, different virtual parts under the same part type have different attributes, and the user can replace some virtual parts possessed by the controlled virtual object through a selection operation in the part selection interface, so that an eventually synthesized virtual vehicle has specific attributes. The attributes are used for representing performance values of the synthesized virtual vehicle, such as a speed of the virtual vehicle and steering difficulty of the virtual vehicle. These values are also the attributes of the virtual vehicle. In some embodiments, the terminal can display the replaced virtual part in the virtual scene, and other users can control the virtual object to pick up the virtual part.

Based on the above implementation, in some embodiments, after the terminal determines any virtual part as the virtual part possessed by the controlled virtual object, in response to a selection operation on other virtual parts among the plurality of to-be-selected virtual parts, the terminal displays second prompt information, the second prompt information being used for prompting that the virtual part cannot be selected. In other words, for one virtual vending machine, the user can only select one virtual part for the controlled virtual object. If one virtual vending machine can provide all the virtual parts, then a user who first finds the virtual vending machine can synthesize the virtual vehicle first. The user who synthesizes the virtual vehicle has an excessive advantage in confrontation when compared with other users, which leads to imbalance of the game. By limiting a quantity of virtual parts available in the virtual vending machine, balance of the game can be improved. The user needs to look for a plurality of virtual vending machines in the virtual scene to be able to assemble the virtual parts.

In some embodiments, the terminal displays, in a case that a health value of any virtual object meets a target health value condition, a plurality of virtual parts possessed by the virtual object at a target drop position, the target drop position being a position of the virtual object in the virtual scene. In a case that a distance between the controlled virtual object and the target drop position is less than or equal to a second distance threshold, the terminal determines a plurality of virtual parts of a first type as the virtual parts possessed by the controlled virtual object. The virtual part of the first type refers to a virtual part corresponding to a part type that is not yet possessed by the controlled virtual object among the plurality of virtual parts possessed by the virtual object.

That the health value meets the target health value condition means that the health value is 0 or the health value is less than or equal to a health value threshold. In some embodiments, if the health value of a virtual object is 0, a state of the virtual object is referred to as being defeated or killed.

In an implementation, when the user controls the controlled virtual object to approach any virtual object whose health value meets the target health value condition in the virtual scene, the terminal can control the controlled virtual object to automatically pick up the virtual parts dropped by the virtual object. When controlling the controlled virtual object to pick up the virtual parts dropped by the virtual object, the terminal can control the controlled virtual object to pick up only the virtual part corresponding to the part type not yet possessed, to ensure that the controlled virtual object only possesses one virtual part under each part type.

In order to provide a clearer description of the above implementation, the above implementation will be described in three parts below.

First, a manner in which the terminal displays the plurality of virtual parts possessed by the virtual object at the target drop position is described.

In some embodiments, in a case that the health value of any virtual object in the virtual scene is 0, that is, a state of the virtual object is defeated, the terminal displays a plurality of virtual parts possessed by the virtual object at a position where the virtual object is defeated. Since the virtual object cannot continue to move in the virtual scene after being defeated, the position where the virtual object is defeated is the target drop position. In some embodiments, the health value is also referred to as a life value or blood volume, which is not limited in the embodiments of this disclosure.

In some embodiments, in a case that the health value of any virtual object in the virtual scene is greater than zero and less than or equal to the health value threshold, the terminal can perform any one of the following:

1. The terminal displays the plurality of virtual parts possessed by the virtual object at a position at which the health value of the virtual object is less than or equal to the health value threshold, the position is a target display position, and the virtual part will not move with the movement of the virtual object.

2. The terminal displays the plurality of virtual parts possessed by the virtual object around the virtual object, and a position of the virtual object is the target display position. In other words, the virtual part can move with the movement of the virtual object.

Second, a manner in which the terminal determines the distance between the controlled virtual object and the target drop position is described.

In some embodiments, the terminal disposes a plurality of invisible collision detection boxes around the target drop position, the collision detection boxes do not block the virtual objects moving in the virtual scene, and the longest distance between each collision detection box and the target drop position is the second distance threshold. In a case that the controlled virtual object is in contact with any collision detection box, the terminal determines that the distance between the controlled virtual object and the target drop position is less than or equal to the second distance threshold. In some embodiments, the terminal determines the contact between the controlled virtual object and the collision detection box by determining whether there is an overlapping portion between a model of the controlled virtual object and the collision detection box. In a case that there is an overlapping portion between the model of the controlled virtual object and the collision detection box, the terminal determines that the controlled virtual object is in contact with the collision detection box.

In some embodiments, the terminal divides the virtual scene into a plurality of invisible grids, and the controlled virtual object can span different grids when the controlled virtual object is continuously moving in the virtual scene. In a case that the controlled virtual object enters a grid where the target display position is located, the terminal can determine the distance between the controlled virtual object and the target display position in real time. In some embodiments, the terminal can determine the distance between the controlled virtual object and the target display position according to a coordinate of the controlled virtual object in the virtual scene and a coordinate of the target display position in the virtual scene. In this way, the terminal does not need to determine the distance between the controlled virtual object and the target display position in real time, but only needs to start detection when the controlled virtual object enters a specific grid, thereby reducing the consumption of computing resources of the terminal.

Third, a manner in which the terminal determines the plurality of virtual parts of the first type as the virtual parts possessed by the controlled virtual object is described.

In some embodiments, in a case that the controlled virtual object is in contact with any collision detection box around the target drop position, the terminal determines the plurality of virtual parts of the first type from the plurality of virtual parts possessed by the virtual object. The terminal sends a part addition request to the server, the part addition request carrying identifiers of the plurality of virtual parts of the first type and an identifier of the controlled virtual object. Upon receiving the part addition request, the server obtains the identifiers of the plurality of virtual parts of the first type and the identifier of the controlled virtual object from the part addition request, to establish a binding relationship between the identifiers of the plurality of virtual parts of the first type and the identifier of the controlled virtual object. In other words, the plurality of virtual parts of the first type are determined as the virtual parts possessed by the controlled virtual object, and this process is referred to as adding the virtual part for the controlled virtual object.

In some embodiments, the terminal displays, in a case that a health value of any virtual object meets a target health value condition, a plurality of virtual parts possessed by the virtual object at a target drop position, the target drop position being a position of the virtual object in the virtual scene. The terminal displays a part picking interface in the virtual scene in a case that the distance between the controlled virtual object and the target drop position is less than or equal to the second distance threshold, the part picking interface displaying a plurality of virtual parts of a second type, the plurality of virtual parts of the second type being virtual parts corresponding to part types already possessed by the controlled virtual object among the plurality of virtual parts possessed by the any virtual object. The terminal replaces, in response to a selection operation on the part picking interface, the virtual part of the same part type possessed by the controlled virtual object with a selected virtual part.

In this implementation, when the controlled virtual object approaches the target drop position, the user can replace a virtual part of a certain part type possessed by the controlled virtual object through the part picking interface displayed by the terminal. The replacement manner is simple and convenient, and the human-machine interaction efficiency is high.

In step 502, a part presentation region is displayed by the terminal in a virtual scene in response to a part presentation instruction, the part presentation region being used for presenting virtual parts possessed by a controlled virtual object.

Figure 8:
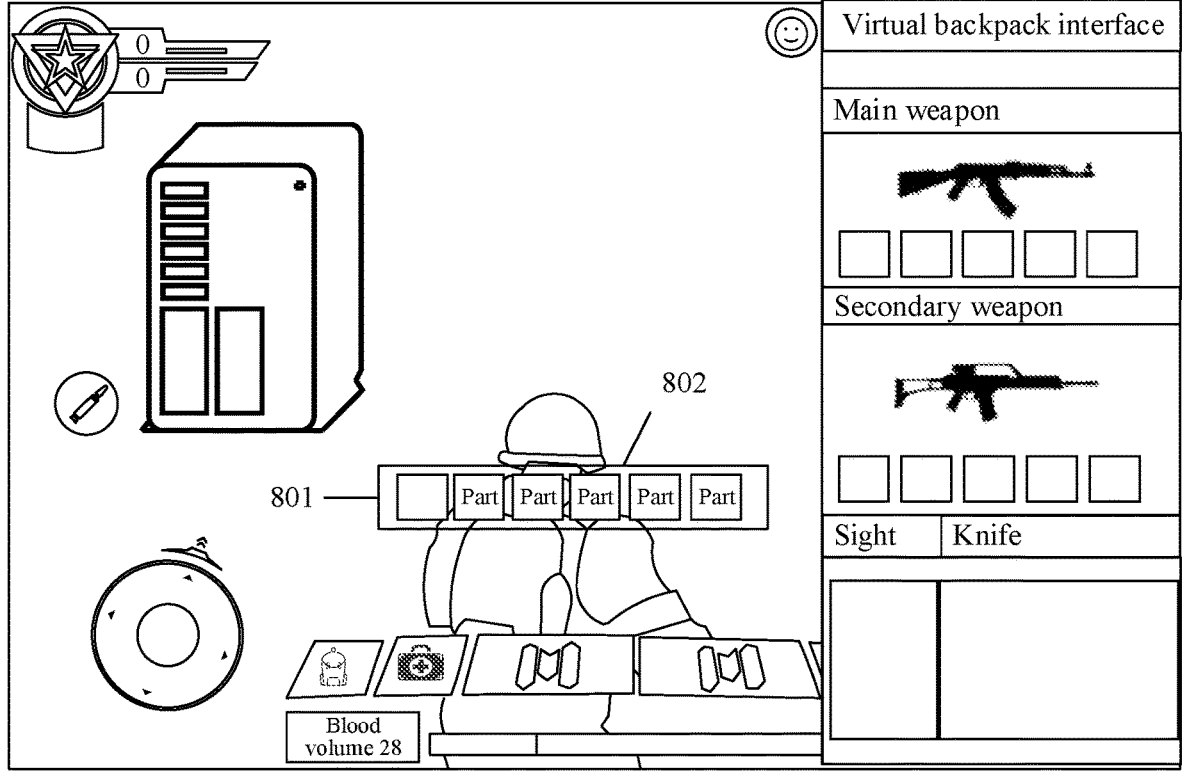
FIG. 8 is a schematic diagram of an interface according to an embodiment of this disclosure.

In some embodiments, referring to FIG. 8, in response to the part presentation instruction, the terminal displays a part presentation region 801 in the virtual scene, the part presentation region displaying the virtual parts possessed by the controlled virtual object.

In some embodiments, the part presentation instruction is triggered by any one of the following manners:

Manner 1: The terminal triggers the part presentation instruction in response to a click operation on a virtual part presentation control displayed in the virtual scene. In some embodiments, the part presentation control is also a backpack presentation control. After the user clicks on the backpack presentation control, the terminal can display a virtual backpack interface of the controlled virtual object in addition to the part presentation region. The virtual backpack interface displays virtual props possessed by the controlled virtual object, such as virtual firearms, virtual ammunition, and virtual bulletproof vests. In some embodiments, the part presentation region is a region in the virtual backpack interface, which is not limited in the embodiments of this disclosure.

Manner 2: The terminal triggers the part presentation instruction in a case that the distance between the controlled virtual object and the virtual vending machine is less than or equal to the first distance threshold. In other words, when the controlled virtual object approaches the virtual vending machine in the virtual scene, the terminal can directly trigger the part presentation instruction.

In some embodiments, a plurality of virtual part presentation grids are displayed in the part presentation region, each virtual part presentation grid being used for presenting a virtual part of one part type. After the controlled virtual object obtains the virtual part, the terminal can display the virtual part in a corresponding virtual part presentation grid according to a part type of the obtained virtual part. Referring to FIG. 8, a plurality of virtual part presentation grids 802 are displayed in the part presentation region 801, each virtual part presentation grid displaying a virtual part of a corresponding part type. In some embodiments, each grid is used for presenting one virtual part. In addition to being able to present the virtual part possessed by the controlled virtual object through the part presentation region, the terminal is also able to mark the part type of the virtual part possessed by the controlled virtual object through different grids, so that the user can more intuitively determine the part type of the virtual part already possessed by the controlled virtual object, thereby improving the presentation efficiency of the virtual part, and making the efficiency of human-machine interaction high.

In step 503, a synthetic control is displayed by the terminal in the virtual scene in a case that a plurality of virtual parts presented in the part presentation region meet a target condition.

In some embodiments, the terminal converts the plurality of virtual parts into one first target prop in a case that the plurality of virtual parts presented in the part presentation region meet the target condition. The terminal displays the synthetic control in the virtual scene in response to obtaining the first target prop by conversion.

In order to provide a clearer description of the above implementation, the above implementation will be described in two parts below.

First part, a manner in which the terminal converts the plurality of virtual parts into one first target prop in a case that the plurality of virtual parts presented in the part presentation region meet the target condition is described.

In some embodiments, that the plurality of virtual parts meet the target condition means that a quantity of the plurality of virtual parts meets a target quantity condition, and part types corresponding to the plurality of virtual parts meet at least one of target part type conditions. That the quantity meets the target quantity condition means that the quantity of the plurality of virtual parts is greater than or equal to a target quantity threshold. That the part type meets the target part type condition means that the part types of the plurality of virtual parts match a plurality of preset part types. For example, the preset part types include five types of a chassis, an engine, an armor, a barrel, and a secondary weapon. If the plurality of virtual parts respectively correspond to the five part types, the plurality of virtual parts meet the target part type condition.

In some embodiments, the terminal converts the plurality of virtual parts into one virtual vehicle blueprint in a case that the plurality of virtual parts presented in the part presentation region meet the target condition, the virtual vehicle blueprint being the first target prop. In some embodiments, the terminal can display the virtual vehicle blueprint in the part presentation region, and the user can determine the virtual vehicle blueprint possessed by the controlled virtual object by viewing the part presentation region. In some embodiments, when the terminal converts the plurality of virtual parts into one virtual vehicle blueprint, the terminal can further cancel the display of the plurality of virtual parts in the part presentation region. In this way, the effect of converting the plurality of virtual parts into one virtual vehicle blueprint is embodied.

In some embodiments, different types of first target props correspond to different types of virtual vehicles, and the type of the first target prop is determined by the plurality of virtual parts before conversion. For example, the types of virtual vehicles include three broad categories of light tanks, medium tanks, and heavy tanks. Each broad category includes a plurality of subcategories, for example, a broad category of light tanks includes subcategories such as light tank 1, light tank 2, and light tank 3. If the virtual parts selected by the user all correspond to the light tank, the first target prop obtained by conversion corresponds to the light tank.

Figure 9:
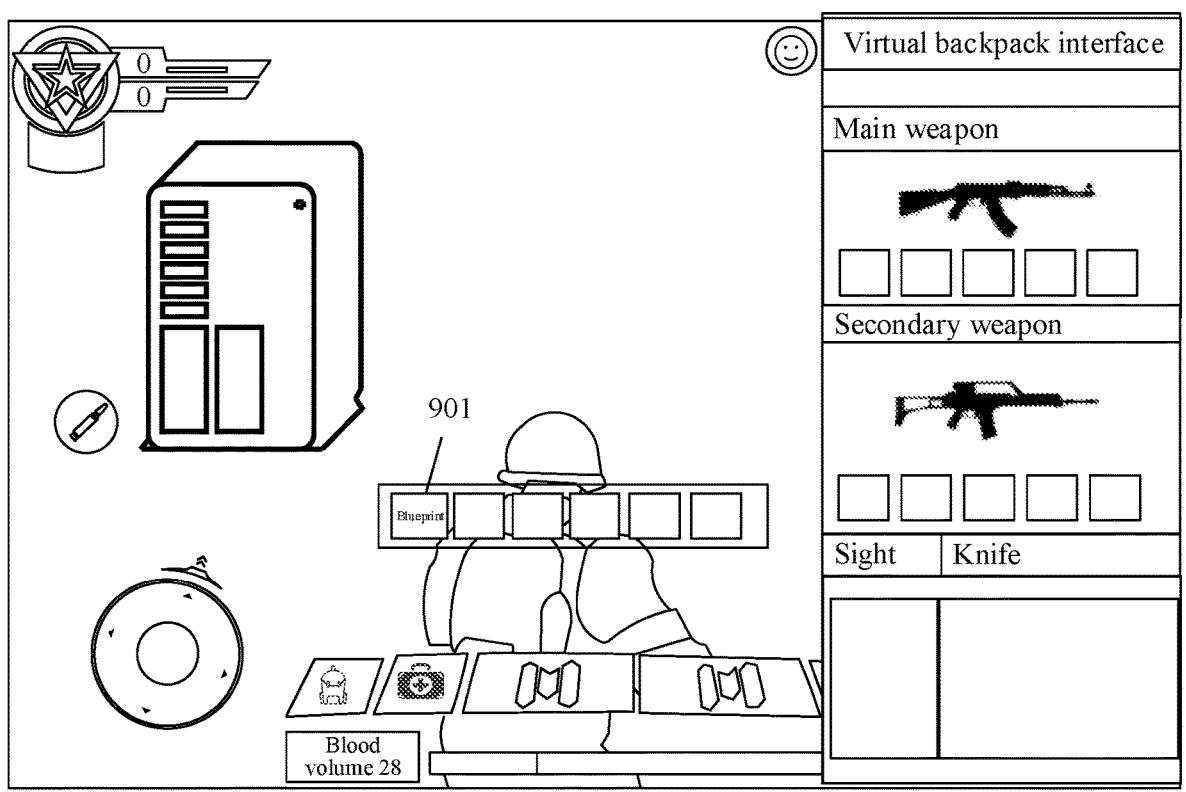
FIG. 9 is a schematic diagram of an interface according to an embodiment of this disclosure.

For example, referring to FIG. 9, the terminal converts the plurality of virtual parts into one first target prop 901 in a case that the plurality of virtual parts presented in the part presentation region meet the target condition.

Second, a manner in which the terminal displays the synthetic control in the virtual scene in a case that the first target prop is obtained by conversion is described.

Figure 10:
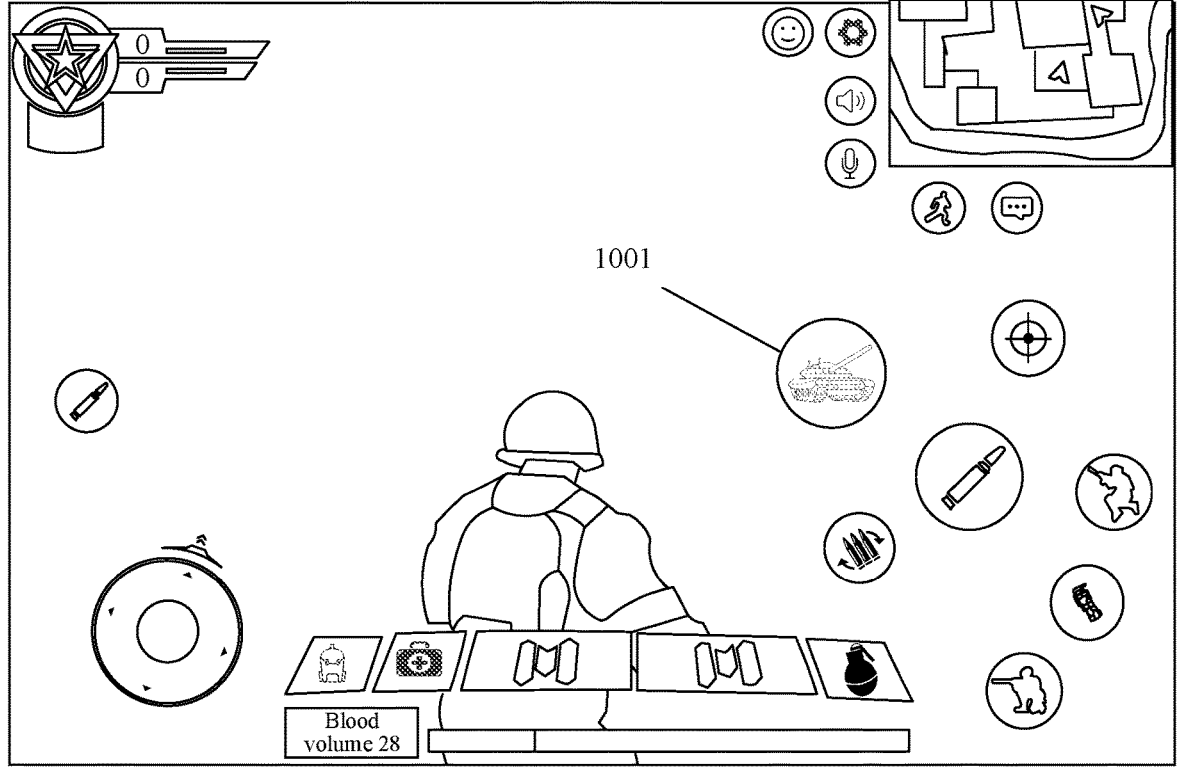
FIG. 10 is a schematic diagram of an interface according to an embodiment of this disclosure.

In some embodiments, referring to FIG. 10, the terminal displays a synthetic control 1001 in the virtual scene in a case that the first target prop is obtained by conversion. The user can control the terminal to display the virtual vehicle in the virtual scene by clicking on the synthetic control 1001.

The above steps 501 to 503 are further described with reference to FIG. 11.

Figure 11:
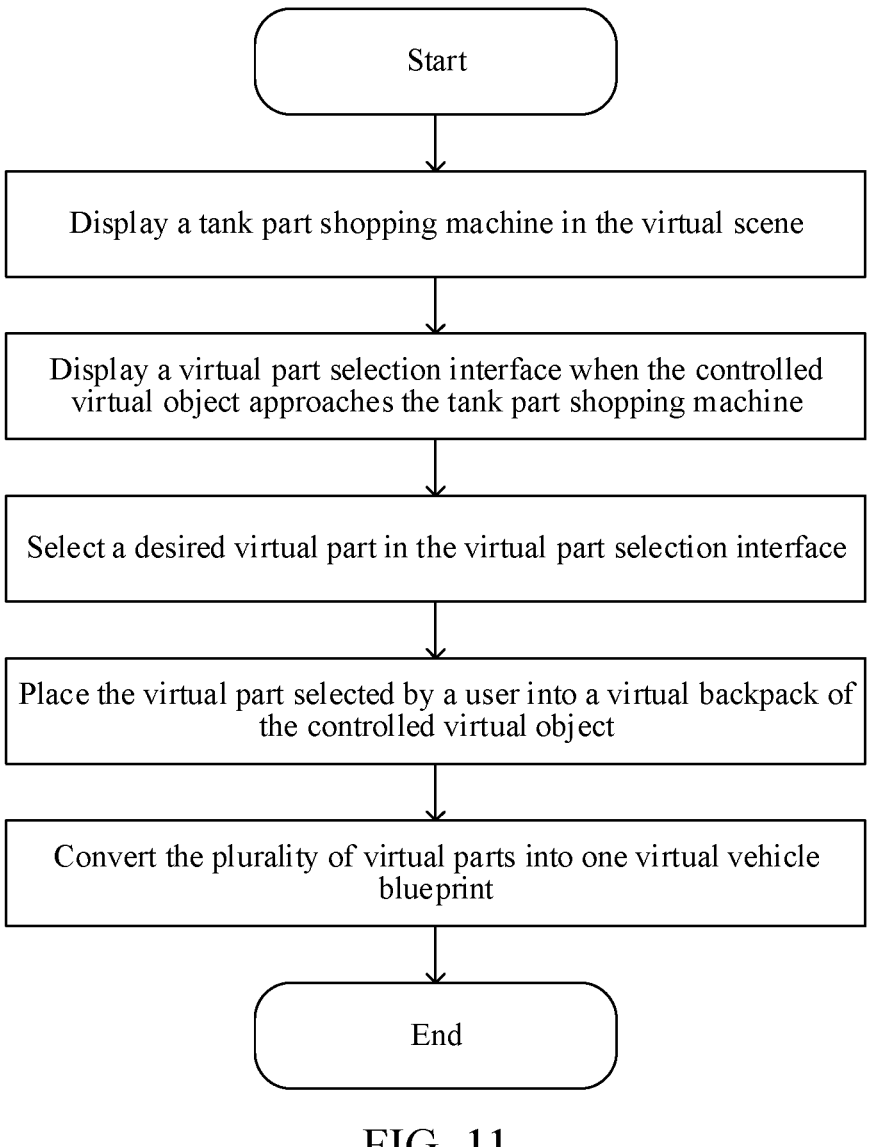
FIG. 11 is a flowchart of a display method for a virtual vehicle according to an embodiment of this disclosure.

Referring to FIG. 11, the virtual vending machine is displayed in the virtual scene. If the virtual vehicle is a virtual tank, the virtual vending machine is also referred to as a tank part shopping machine. After the user controls the controlled virtual object to approach the tank part shopping machine, the user can select a desired virtual part through the displayed part selection interface. The terminal places the virtual part selected by the user into a virtual backpack of the controlled virtual object, that is, the controlled virtual object obtains the virtual part. In a case that at least one of the quantity and type of the virtual part possessed by the controlled virtual object meets the target condition, the terminal converts the plurality of virtual parts possessed by the controlled virtual object into one virtual vehicle blueprint, and if the virtual vehicle is a virtual tank, the virtual vehicle blueprint is also referred to as a virtual tank blueprint.

In step 504, a first target vehicle is displayed by the terminal in the virtual scene in response to a trigger operation on the synthetic control, the first target vehicle being a virtual vehicle synthesized by the plurality of virtual parts.

There can be a variety of types of virtual vehicles, such as virtual motorcycles, virtual cars, virtual yachts, and virtual tanks. In the following explanation, description is made using an example in which the virtual vehicle is a virtual tank.

In some embodiments, the terminal determines a target display position of the first target vehicle in the virtual scene in response to the trigger operation on the synthetic control. The terminal displays the first target vehicle at the target display position in response to the target display position meeting a target display condition.

In order to provide a clearer description of the above implementation, the above implementation will be described in two parts below.

First, a manner in which the terminal determines the target display position of the first target vehicle in the virtual scene in response to the trigger operation on the synthetic control is described. The trigger operation includes a drag operation, a click operation, a press operation, and the like.

In some embodiments, in response to a drag operation on the synthetic control, the terminal determines an end position of the drag operation as the target display position of the first target vehicle in the virtual scene.

In this implementation, the user can determine the target display position of the virtual vehicle by the drag operation on the synthetic control, and thus the degree of freedom in determining the target display position is high.

In some embodiments, the terminal sets a state of the synthetic control to a draggable state in a case that a duration of a press operation on the synthetic control meets a target duration condition. In response to the drag operation on the synthetic control, the terminal determines a position of the synthetic control when the drag operation ends as the target display position of the first target vehicle. That the duration of the press operation meets the target duration condition means that the duration of the press operation is greater than or equal to a duration threshold. The duration threshold may be set, for example by the technician, according to the actual situation, such as set to 0.3 seconds or 0.5 seconds, which is not limited in the embodiments of this disclosure.

In some embodiments, in response to a click operation on the synthetic control, the terminal determines a position with a target distance in front of the controlled virtual object in the virtual scene as the target display position. The target distance may be set, for example by the technician, according to the actual situation, which is not limited in the embodiments of this disclosure.

In this implementation, when the user clicks on the synthetic control, the terminal can automatically determine the target display position. Since the target display position does not need to be determined by the user, the manner for determining the target display position is simple and efficient, and the efficiency of human-machine interaction is high.

In some embodiments, the terminal displays a model of the first target vehicle in the virtual scene in a case that the duration of the press operation on the synthetic control meets the target duration condition. In response to a drag operation on the model of the first target vehicle, the terminal determines a position at which the drag operation ends as the target display position.

In this implementation, the user can preview the target display position in real time when determining the target display position, thereby improving the efficiency of determining the target display position.

Second, a manner in which the terminal displays the first target vehicle at the target display position in a case that the target display position meets the target display condition is described.

In some embodiments, that the target display position meets the target display condition refers to at least one of the following: an area of the target display position is greater than or equal to an occupied area of the first target vehicle; and there is no virtual building above the target display position. The area of the target display position being greater than or equal to the occupied area of the first target vehicle is to ensure that the target display position can accommodate the first target vehicle. The absence of any virtual building above the target display position is to ensure that the virtual vehicle can be displayed in the virtual scene normally.

Figure 12:
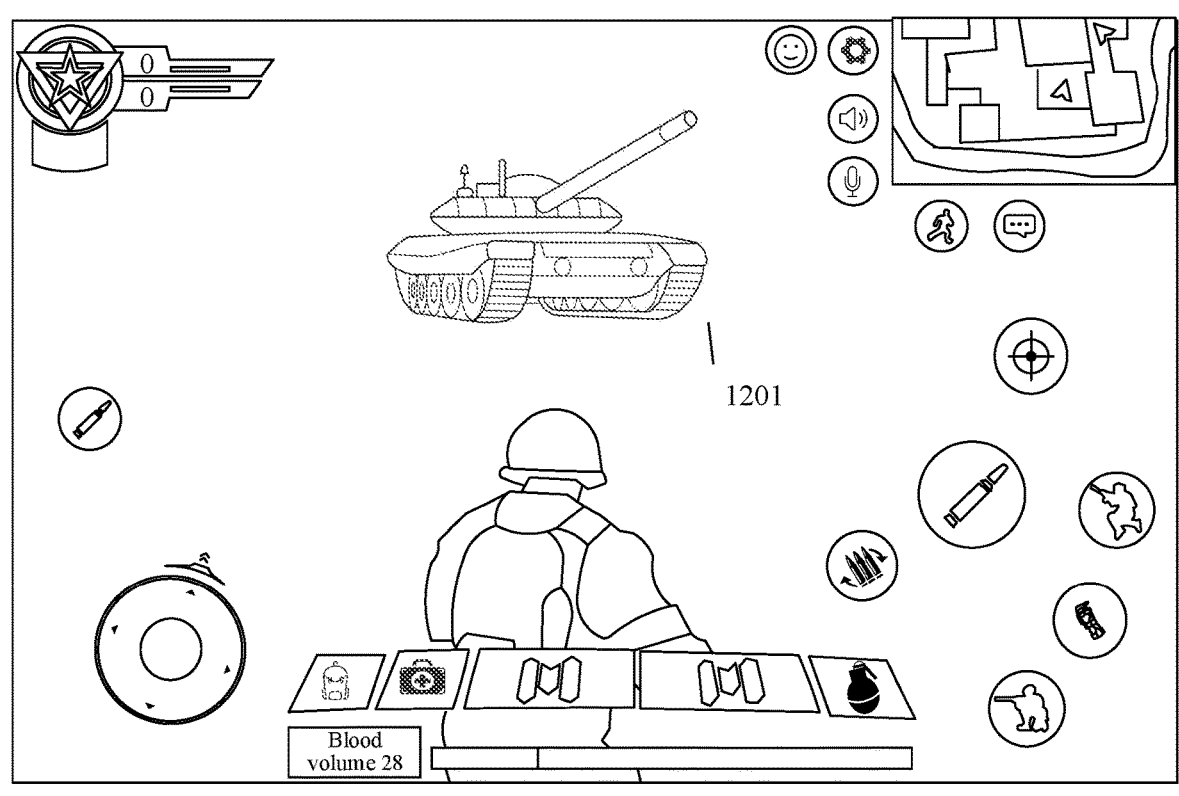
FIG. 12 is a schematic diagram of an interface according to an embodiment of this disclosure.

In some embodiments, the terminal can control the first target vehicle to fall from the sky of the virtual scene to the target display position in a case that the target display position meets the target display condition. For example, referring to FIG. 12, the terminal can display a virtual vehicle 1201 in the virtual scene.

In some embodiments, the terminal controls the first target vehicle to fall from the sky of the virtual scene to the target display position at a target movement speed in a case that the target display position meets the target display condition, the target movement speed being associated with the type of the virtual vehicle.

For example, the virtual vehicle is a virtual tank, which includes a light tank, a medium tank, and a heavy tank, then the terminal can determine the target movement speed according to a type of the virtual tank. For example, in order to simulate a real scene, the technician makes the following settings through the terminal: Target movement speed for light tanks>Target movement speed for medium tanks>Target movement speed for heavy tanks. The target movement speed corresponding to each type of virtual tank may be set, for example by the technician, according to the actual situation, which is not limited in the embodiments of this disclosure.

In some embodiments, before the terminal controls the first target vehicle to fall from the sky of the virtual scene to the target display position, the terminal can further display a virtual transporter in the virtual scene. In response to the virtual transporter flying above the target display position, the terminal controls the virtual transporter to deliver the first target vehicle into the virtual scene, the first target vehicle falling from the sky of the virtual scene to the target display position. In some embodiments, in a process in which the first target vehicle falls from the sky of the virtual scene to the target display position, the terminal can further display a virtual parachute connected to the first target vehicle above the first target vehicle, so that the falling process of the first target vehicle is more realistic.

Figure 13:
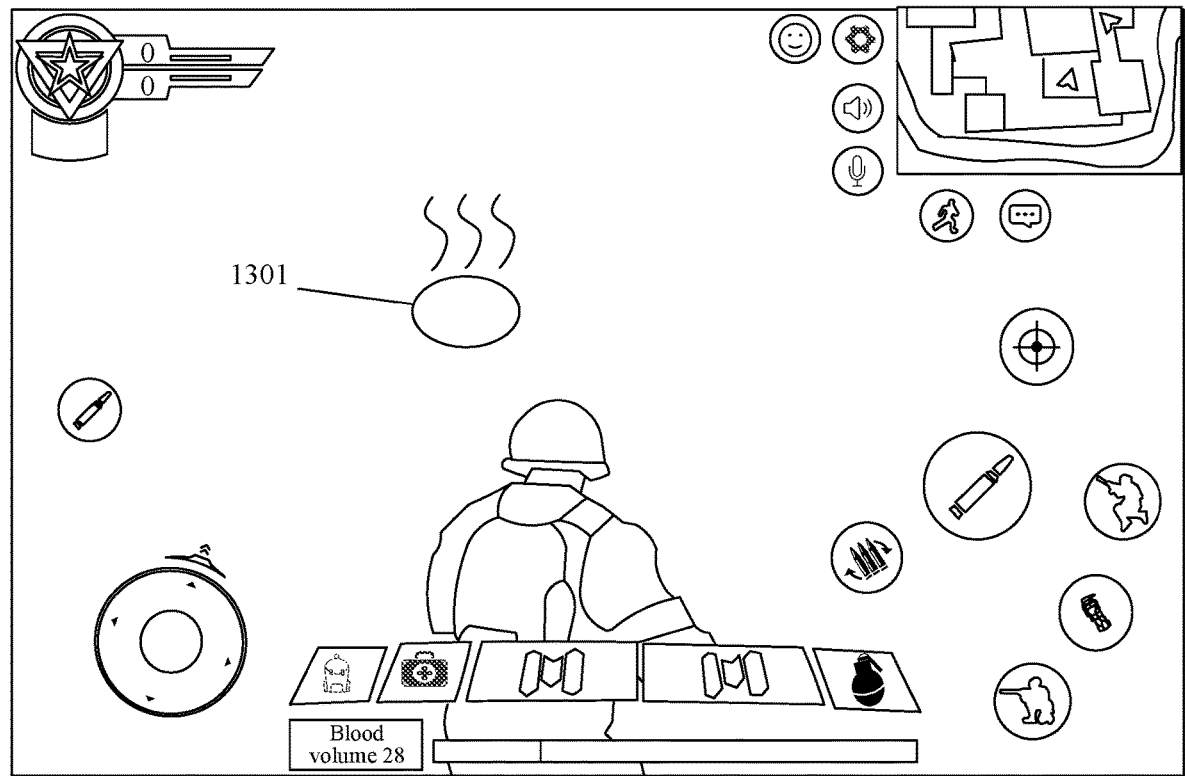
FIG. 13 is a schematic diagram of an interface according to an embodiment of this disclosure.

In some embodiments, before the terminal controls the first target vehicle to fall from the sky of the virtual scene to the target display position, the terminal can further display virtual smoke at the target display position, the virtual smoke being used for reminding that the first target vehicle will fall to the target display position. For example, referring to FIG. 13, the terminal displays virtual smoke 1301 at the target display position.

In this implementation, the terminal can remind the user that the first target vehicle is about to drop by displaying the virtual smoke before controlling the first target vehicle to fall to the target display position, so that the user can intuitively determine a target display position that the first virtual vehicle is about to reach according to the virtual smoke, thereby controlling the virtual object away from the target display position, so as to prevent the first target vehicle from causing harm to the virtual object. The reminding manner is intuitive and efficient, and the efficiency of human-machine interaction is high.

In some embodiments, the terminal can further control a color of the virtual smoke when displaying the virtual smoke. For example, the color of the virtual smoke is set to red, yellow, or the like, which is not limited in the embodiments of this disclosure. In some embodiments, the terminal can further adjust the color of the virtual smoke according to a falling progress of the first target vehicle. For example, when the first target vehicle just falls, the terminal sets the color of the virtual smoke to green. When the first target vehicle falls to half, the terminal adjusts the color of the virtual smoke to yellow. When the first target vehicle is about to fall to the target display position, the terminal adjusts the color of the virtual smoke to red. In this implementation, a falling speed of the first target vehicle is prompted by adjusting the color of the virtual smoke, so that the user can intuitively know the falling progress of the first target vehicle by observing a change in the color of the virtual smoke, and the reminding manner is intuitive and efficient, which improves the efficiency of human-machine interaction.

In some embodiments, in the process of terminal controlling the falling of the first target vehicle, any one of the following can further be performed.

In a case that the first target vehicle comes into contact with any virtual vehicle during the falling process, the terminal sets a state of the virtual vehicle as being destroyed. Setting the state of the virtual vehicle as being destroyed refers to adjusting a health value of the virtual vehicle to 0. In some embodiments, the health value of the virtual vehicle is also referred to as a life value, blood volume, wear level or the like of the virtual vehicle, which is not limited in the embodiments of this disclosure. If the state of the virtual vehicle is set as being destroyed, the virtual vehicle will no longer be available.

In a case that the first target vehicle comes into contact with any virtual object during the falling process, the terminal sets a state of the virtual object as being defeated. Setting the state of the virtual object as being defeated refers to adjusting a health value of the virtual object to 0.

Based on the above implementation, in some embodiments, the terminal displays first prompt information in the virtual scene in a case that the target display position does not meet the target display condition, the first prompt information being used for prompting that the target display position does not meet the target display condition.

Figure 14:
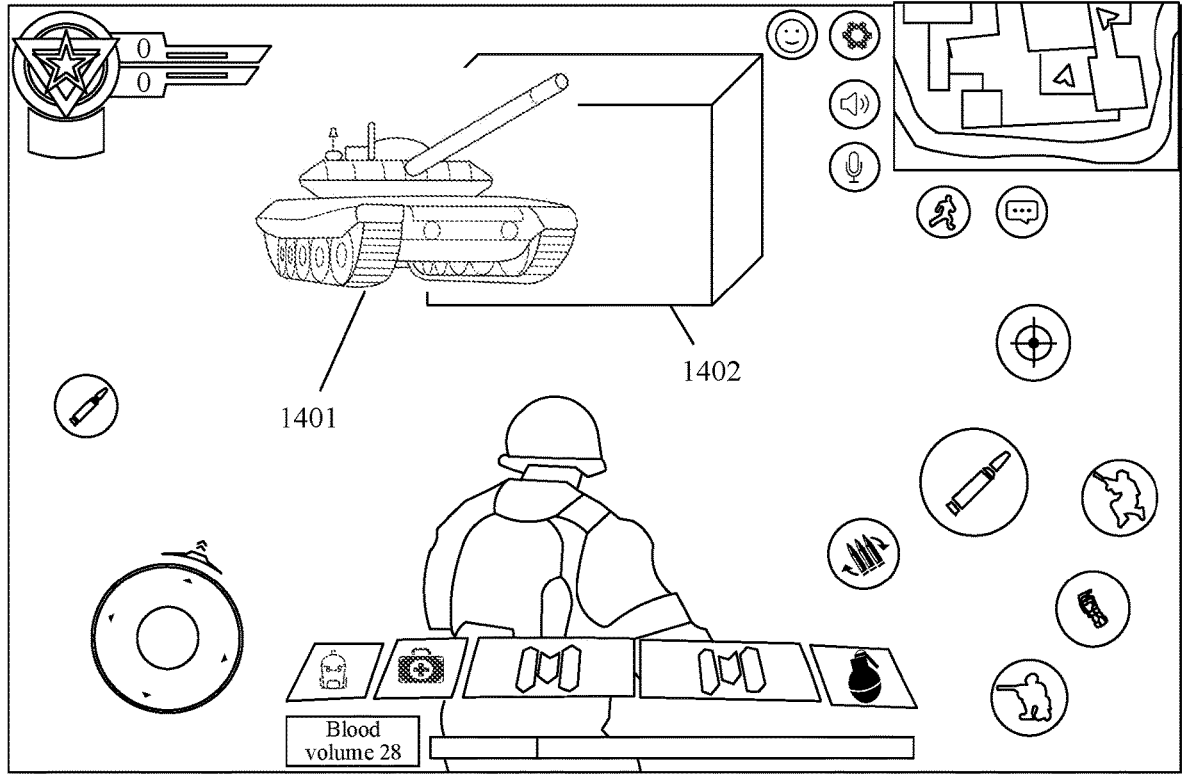
FIG. 14 is a schematic diagram of an interface according to an embodiment of this disclosure.

For example, in response to the target display position not meeting the target display condition, the terminal displays a prompt graphic in a target color in the virtual scene, the prompt graphic being used for representing an outline of the first target vehicle. In some embodiments, the target color may be set, for example by the technician, according to the actual situation, such as set to red or yellow, which is not limited in the embodiments of this disclosure. For example, referring to FIG. 14, the terminal displays a prompt graphic 1401 in the virtual scene. There is a virtual building 1402 at the target display position. The prompt graphic 1401 can represent the outline of the first target vehicle.

In some embodiments, after the terminal displays the first target vehicle in the virtual scene, the user can control the controlled virtual object to drive the first target vehicle to move in the virtual scene or fight against other virtual objects, or the like. In some embodiments, in a case that a distance between the controlled virtual object and the first target vehicle is less than or equal to a third distance threshold, the terminal displays a vehicle ride control in the virtual scene. In response to an operation on the vehicle ride control, the terminal controls the controlled virtual object to enter the first target vehicle, and thus the user can control the first target vehicle to move. When the user controls the first target vehicle to move in the virtual scene, the user can also control a virtual weapon of the first target vehicle to fire, thereby causing harm to other virtual objects or virtual vehicles.

Any combination of all the foregoing exemplary technical solutions can be used to form additional embodiments of this disclosure, and details are not described herein again.

The above steps 503 and 504 are described with reference to FIG. 15.

Figures 15, 16:
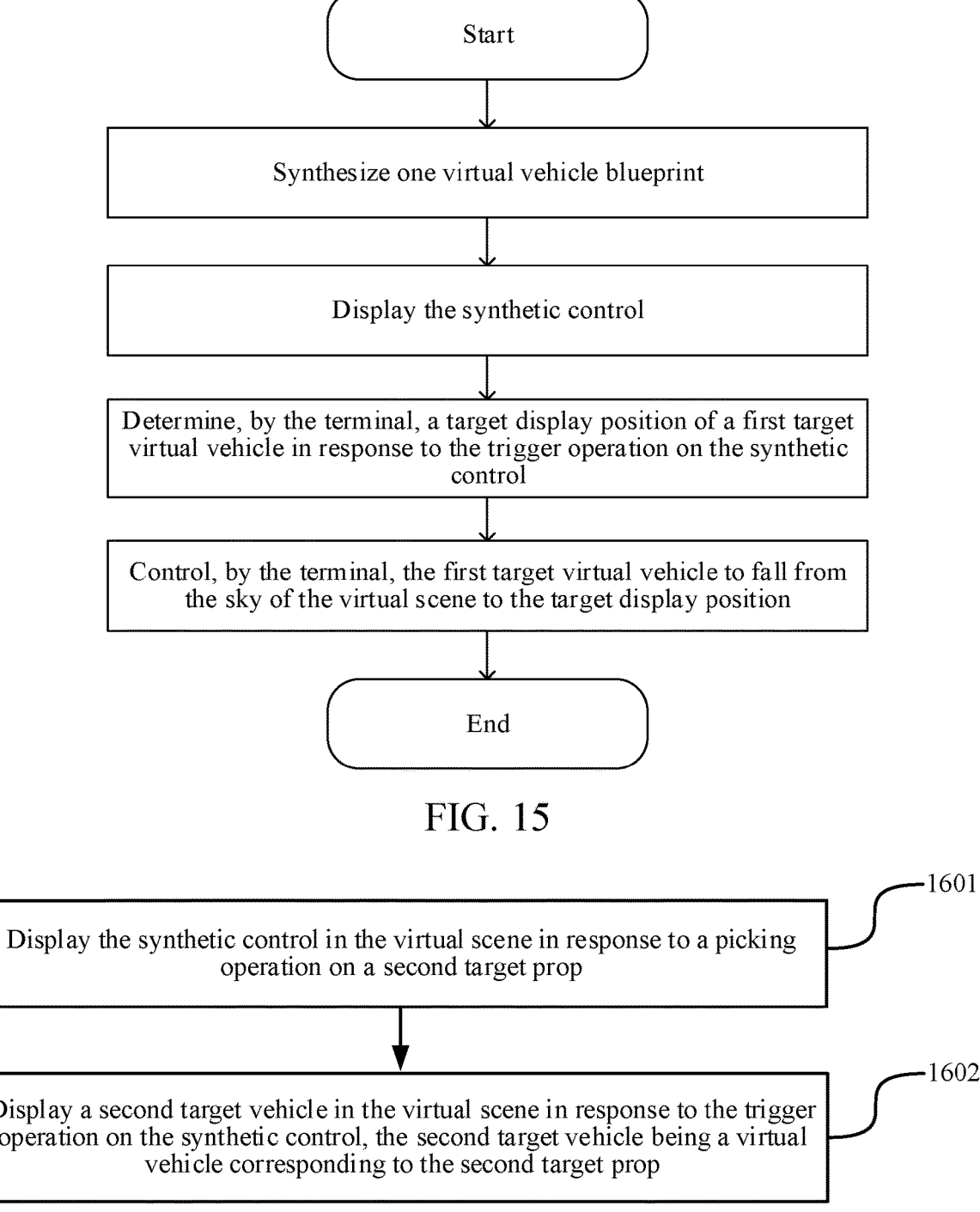
FIG. 15 is a flowchart of a display method for a virtual vehicle according to an embodiment of this disclosure.
FIG. 16 is a flowchart of a display method for a virtual vehicle according to an embodiment of this disclosure.

Referring to FIG. 15, in a case that the plurality of virtual parts possessed by the controlled virtual object are synthesized into one virtual vehicle blueprint, the terminal displays the synthetic control in the virtual scene. The terminal determines the target display position of the first target vehicle in response to the trigger operation on the synthetic control. The terminal controls the first target vehicle to fall from the sky of the virtual scene to the target display position.

The part presentation region is displayed in the virtual scene, so that the virtual part already possessed by the controlled virtual object can be presented intuitively. Furthermore, the synthetic control is displayed in a case that the plurality of virtual parts in the part presentation region meet the target condition, that is, the virtual part already possessed by the controlled virtual object meets the target condition, so that by triggering the synthetic control, the plurality of virtual parts can be synthesized into a virtual vehicle, so that a terminal can display the virtual vehicle in the virtual scene. Since a presentation manner of the virtual part is intuitive and efficient, the efficiency of viewing the virtual part by a user can be improved. In addition, since the synthesis of the virtual vehicle can be implemented with only a click of the synthetic control, an operating manner for synthesizing the virtual vehicle is simple and efficient, that is, the efficiency of human-machine interaction is high.

In addition to the above steps 501 to 504, the embodiments of this disclosure further provide another display method for a virtual vehicle. Unlike the above steps 501 to 504, in the following steps, the user does not need to control the controlled virtual object to collect the virtual parts one by one. The user directly controls the controlled virtual object to pick up the virtual props, so as to be able to perform relevant operations to display the virtual vehicle. Referring to FIG. 16, the method includes the following steps.

In step 1601, the synthetic control in the virtual scene is displayed in response to a picking operation on a second target prop.

The second target prop is a virtual prop dropped in the virtual scene. In some embodiments, the second target prop is displayed in the virtual scene by the terminal after a duration of a virtual battle in the virtual scene is greater than or equal to a battle duration threshold, the second target prop is a virtual prop dropped from any defeated virtual object in the virtual scene, or the second target prop is a virtual prop discarded by any virtual object in the virtual scene, which is not limited in the embodiments of this disclosure.

In some embodiments, in a case that a distance between the controlled virtual object and the second target prop is less than or equal to a fourth distance threshold, the terminal displays a prop picking control in the virtual scene. In response to an operation on the prop picking control, the terminal controls the controlled virtual object to pick up the second target prop. In a case that the controlled virtual object picks up the second target prop, the terminal displays the synthetic control in the virtual scene. In some embodiments, different types of second target props correspond to different types of virtual vehicles, and the user can control the terminal to display different types of virtual vehicles by controlling the controlled virtual object to pick up different types of second target props.

The method for displaying the synthetic control in the virtual scene by the terminal may be similar to the above step 503, and the implementation process may refers to the description of the above step 503, which will not be described herein again, as an example.

In some embodiments, before the terminal displays the synthetic control in the virtual scene, the method further includes the terminal discarding, in a case that the controlled virtual object possesses any virtual part, the virtual part in the virtual scene. That is, after the controlled virtual object picks up the second target prop, the terminal controls the controlled virtual object to discard the possessed virtual part.

In some embodiments, after displaying the synthetic control in the virtual scene in response to the picking operation on the second target prop, the method further includes discarding the second target prop in the virtual scene in response to a picking operation on any virtual part. That is, after the controlled virtual object picks up the second target prop, if the controlled virtual object picks up the virtual part again, the terminal controls the controlled virtual object to discard the possessed second target prop.

In step 1602, a second target vehicle in the virtual scene is displayed in response to the trigger operation on the synthetic control, the second target vehicle being a virtual vehicle corresponding to the second target prop.

The step 1602 may be similar to the above step 504, and the implementation process may refer to the description of the above step 504, which will not be described herein again, as an example.

Figure 17:
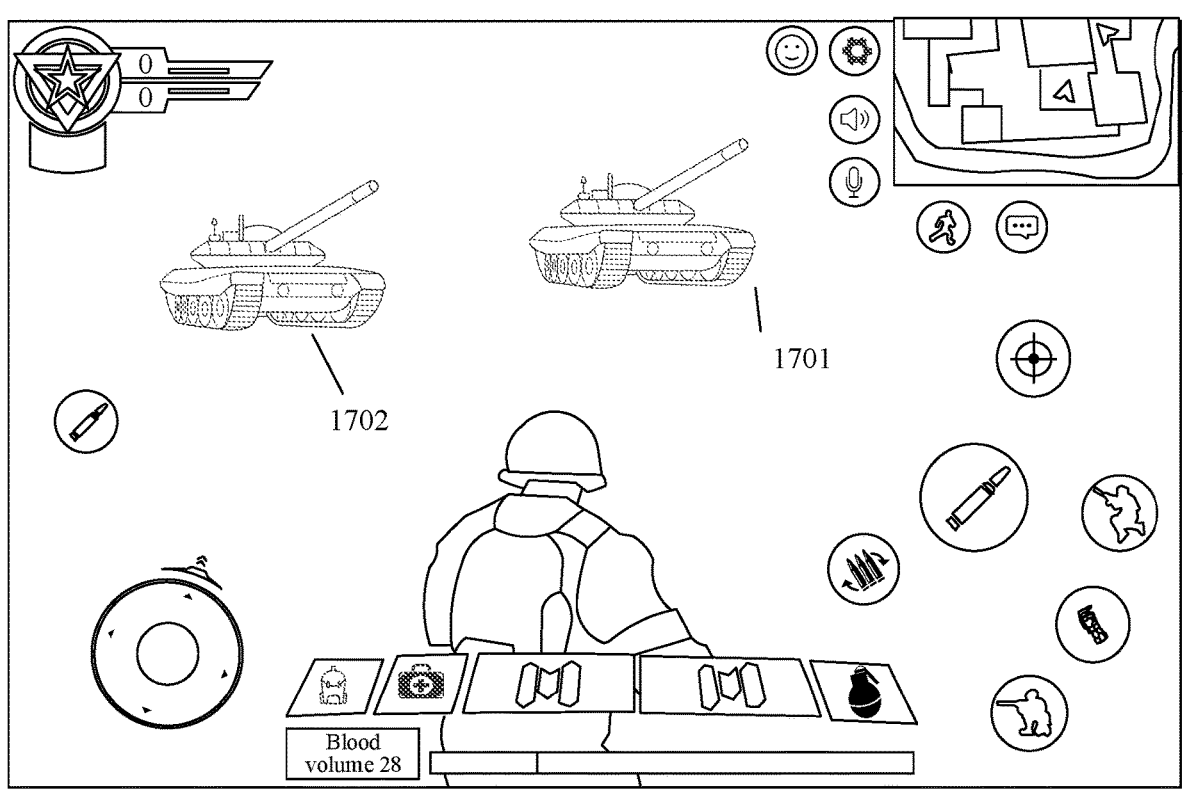
FIG. 17 is a schematic diagram of an interface according to an embodiment of this disclosure.

In some embodiments, after the terminal displays the second target vehicle in the virtual scene, the user can further control the controlled virtual object to obtain another second target prop in the virtual scene, and to control the terminal to display another second target vehicle by consuming the another second target prop. In some embodiments, the two second target vehicles are different types of virtual vehicles. That is, the user can summon two or more virtual vehicles in the virtual scene through the controlled virtual object. Referring to FIG. 17, a virtual vehicle 1701 and a virtual vehicle 1702 summoned by the controlled virtual object are displayed in the virtual scene.

Any combination of all the foregoing exemplary technical solutions may be used to form additional embodiments of this disclosure, and details are not described herein again.

The part presentation region is displayed in the virtual scene, so that the virtual part already possessed by the controlled virtual object can be presented intuitively. Furthermore, the synthetic control is displayed in a case that the plurality of virtual parts in the part presentation region meet the target condition, that is, the virtual part already possessed by the controlled virtual object meets the target condition, so that by triggering the synthetic control, the plurality of virtual parts can be synthesized into a virtual vehicle, so that a terminal can display the virtual vehicle in the virtual scene. Since a presentation manner of the virtual part is intuitive and efficient, the efficiency of viewing the virtual part by a user can be improved. In addition, since the synthesis of the virtual vehicle can be implemented with only a click of the synthetic control, an operating manner for synthesizing the virtual vehicle is simple and efficient, that is, the efficiency of human-machine interaction is high.

Figure 18:
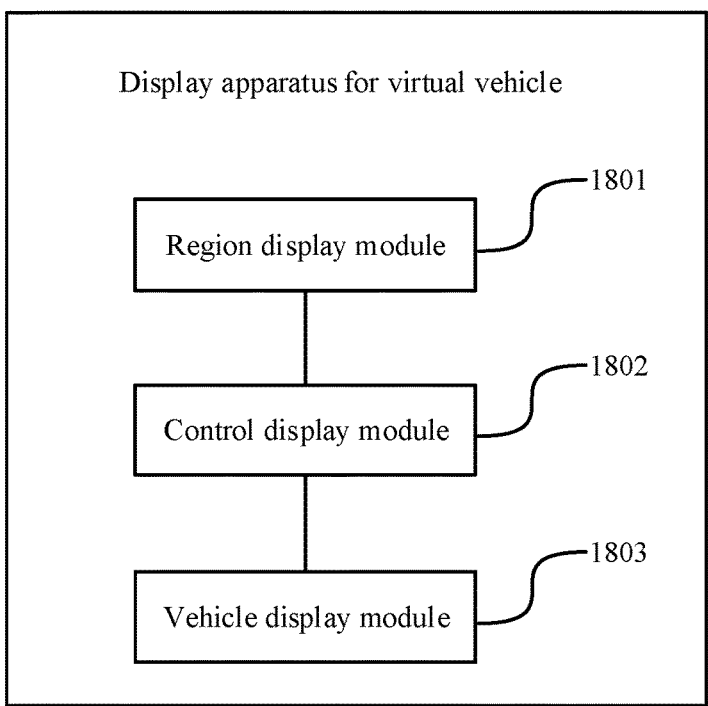
FIG. 18 is a schematic structural diagram of a display apparatus for a virtual vehicle according to an embodiment of this disclosure.

FIG. 18 is a schematic structural diagram of a display apparatus for a virtual vehicle according to an embodiment of this disclosure. Referring to FIG. 18, the apparatus includes: a region display module 1801, a control display module 1802, and a vehicle display module 1803. One or more modules, submodules, and/or units of the apparatus can be implemented by processing circuitry, software, or a combination thereof, for example.

The region display module 1801 is configured to display a part presentation region in a virtual scene in response to a part presentation instruction, the part presentation region being used for presenting virtual parts possessed by a controlled virtual object.

The control display module 1802 is configured to display a synthetic control in the virtual scene in a case that a plurality of virtual parts presented in the part presentation region meet a target condition.

The vehicle display module 1803 is configured to display a first target vehicle in the virtual scene in response to a trigger operation on the synthetic control, the first target vehicle being a virtual vehicle synthesized by the plurality of virtual parts.

In some embodiments, the vehicle display module 1803 is configured to determine a target display position of the first target vehicle in the virtual scene in response to the trigger operation on the synthetic control; and display the first target vehicle at the target display position in a case that the target display position meets a target display condition.

In some embodiments, the apparatus further includes a first prompt module, configured to display first prompt information in the virtual scene in a case that the target display position does not meet the target display condition, the first prompt information being used for prompting that the target display position does not meet the target display condition.

In some embodiments, the first prompt module is configured to display a prompt graphic in a target color in the virtual scene in a case that the target display position does not meet the target display condition, the prompt graphic being used for representing an outline of the first target vehicle.

In some embodiments, the vehicle display module 1803 is configured to determine, in response to a drag operation on the synthetic control, an end position of the drag operation as the target display position of the first target vehicle in the virtual scene.

In some embodiments, the vehicle display module 1803 is configured to control the first target vehicle to fall from the sky of the virtual scene to the target display position in a case that the target display position meets the target display condition.

In some embodiments, the vehicle display module 1803 is configured to control the first target vehicle to fall from the sky of the virtual scene to the target display position at a target movement speed, the target movement speed being associated with a type of the virtual vehicle.

In some embodiments, the apparatus further includes a smoke display module, configured to display virtual smoke at the target display position, the virtual smoke being used for reminding that the first target vehicle will fall to the target display position.

In some embodiments, the apparatus further includes a contact detection module, configured to perform any one of setting a state of any virtual vehicle as being destroyed in a case that the first target vehicle comes into contact with any virtual vehicle during a falling process, and setting a state of any virtual object as being defeated in a case that the first target vehicle comes into contact with any virtual object during the falling process.

In some embodiments, the target display condition refers to at least one of an area of the target display position is greater than or equal to an occupied area of the first target vehicle, or there is no virtual building above the target display position.

In some embodiments, the control display module 1802 is configured to convert the plurality of virtual parts into one first target prop in a case that the plurality of virtual parts presented in the part presentation region meet the target condition; and display the synthetic control in the virtual scene in a case that the first target prop is obtained through conversion.

In some embodiments, a virtual vending machine is displayed in the virtual scene, the virtual vending machine being used for providing the virtual parts, and the apparatus further includes a part determination module, configured to display a part selection interface in the virtual scene in a case that a distance between the controlled virtual object and the virtual vending machine is less than or equal to a first distance threshold, the part selection interface displaying a plurality of to-be-selected virtual parts; and determine, in response to a selection operation on any virtual part among the plurality of to-be-selected virtual parts, a selected virtual part as a virtual part possessed by the controlled virtual object.

In some embodiments, the region display module 1801 is configured to replace, in response to the selection operation on any virtual part among the plurality of to-be-selected virtual parts, the virtual part of the same type possessed by the controlled virtual object with the selected virtual part.

In some embodiments, the apparatus further includes a second prompt module, configured to display second prompt information in response to a selection operation on other virtual parts among the plurality of to-be-selected virtual parts, the second prompt information being used for prompting that the virtual part cannot be selected.

In some embodiments, the apparatus further includes a part determination module, configured to display, in a case that a health value of any virtual object meets a target health value condition, a plurality of virtual parts possessed by the any virtual object at a target drop position, the target drop position being a position of the any virtual object in the virtual scene; and determine a plurality of virtual parts of a first type as the virtual parts possessed by the controlled virtual object in a case that a distance between the controlled virtual object and the target drop position is less than or equal to a second distance threshold, the virtual part of the first type referring to a virtual part corresponding to a part type that is not yet possessed by the controlled virtual object among the plurality of virtual parts possessed by the any virtual object.

In one possible implementation, the part determination module is further configured to display a part picking interface in the virtual scene in a case that the distance between the controlled virtual object and the target drop position is less than or equal to the second distance threshold, the part picking interface displaying a plurality of virtual parts of a second type, the plurality of virtual parts of the second type being virtual parts corresponding to part types already possessed by the controlled virtual object among the plurality of virtual parts possessed by the any virtual object; and replace, in response to a selection operation on the part picking interface, the virtual part of the same type possessed by the controlled virtual object with a selected virtual part.

In some embodiments, the apparatus further includes a prop picking module, configured to display the synthetic control in the virtual scene in response to a picking operation on a second target prop.

The vehicle display module 1803 is further configured to display a second target vehicle in the virtual scene in response to the trigger operation on the synthetic control, the second target vehicle being a virtual vehicle corresponding to the second target prop.

In some embodiments, the apparatus further includes a discarding module, configured to discard, in a case that the controlled virtual object possesses any virtual part, the any virtual part in the virtual scene.

In some embodiments, the apparatus further includes a discarding module, configured to discard the second target prop in the virtual scene in response to a picking operation on any virtual part.

The division of the above functional modules is only described for exemplary purposes when the display apparatus for a virtual vehicle provided in the foregoing embodiments displays the virtual vehicle. In actual application, the functions may be allocated to different functional modules according to specific needs, which means that an internal structure of the computer device is divided into different functional modules to complete all or some of the above described functions. In addition, the display apparatus for a virtual vehicle provided in the foregoing embodiments belongs to the same concept as the embodiments of the display method for a virtual vehicle. For an exemplary implementation process of the display apparatus, refer to the method embodiments. Details are not described herein again.

The part presentation region is displayed in the virtual scene, so that the virtual part already possessed by the controlled virtual object can be presented intuitively. Furthermore, the synthetic control is displayed in a case that the plurality of virtual parts in the part presentation region meet the target condition, that is, the virtual part already possessed by the controlled virtual object meets the target condition, so that by triggering the synthetic control, the plurality of virtual parts can be synthesized into a virtual vehicle, so that a terminal can display the virtual vehicle in the virtual scene. Since a presentation manner of the virtual part is intuitive and efficient, the efficiency of viewing the virtual part by a user can be improved. In addition, since the synthesis of the virtual vehicle can be implemented with only a click of the synthetic control, an operating manner for synthesizing the virtual vehicle is simple and efficient, that is, the efficiency of human-machine interaction is high.

An embodiment of this disclosure provides a computer device, configured to perform the above method. The computer device may be implemented as a terminal or a server. First, a structure of the terminal is described below.

Figures 19, 20:
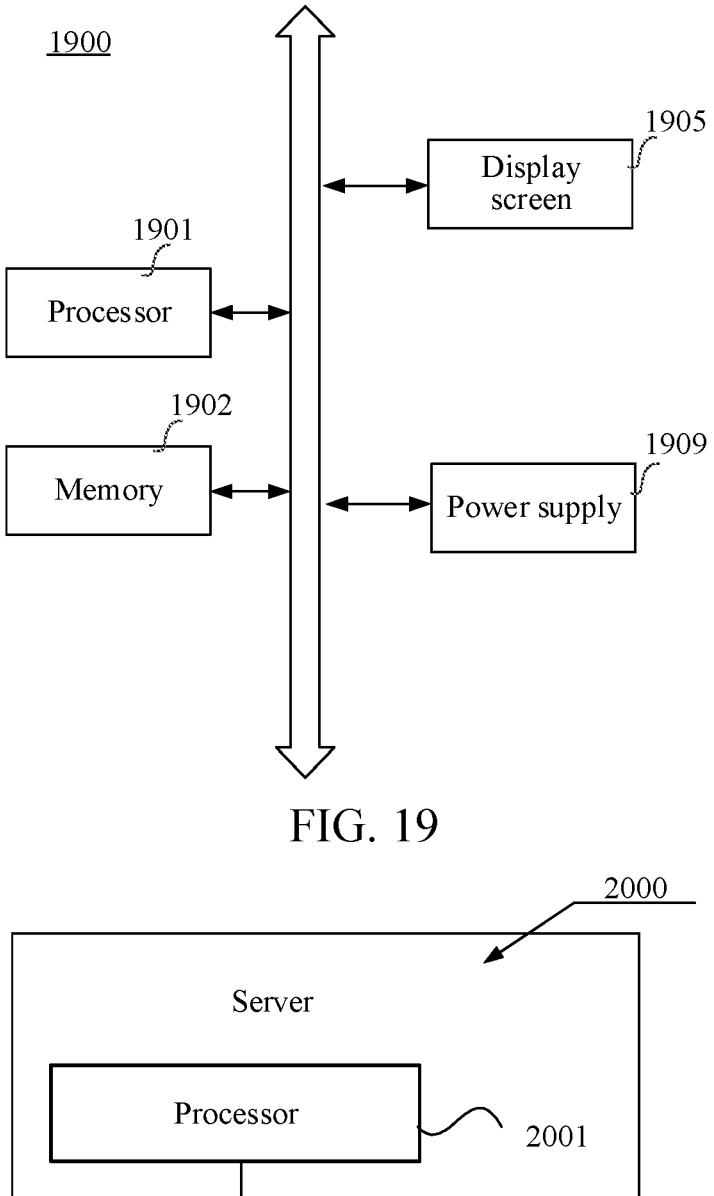
FIG. 19 is a schematic structural diagram of a terminal according to an embodiment of this disclosure.
FIG. 20 is a schematic structural diagram of a server according to an embodiment of this disclosure.

FIG. 19 is a schematic structural diagram of a terminal according to an embodiment of this disclosure.

Generally, a terminal 1900 includes one or more processors 1901 and one or more memories 1902.

Processing circuitry, such as the processor 1901, may include one or more processing cores, for example, a 4-core processor or an 8-core processor. The processor 1901 may be implemented in at least one hardware form of a digital signal processor (DSP), a field-programmable gate array (FPGA), and a programmable logic array (PLA). The processor 1901 may alternatively include a main processor and a coprocessor. The main processor is configured to process data in an active state, also referred to as a central processing unit (CPU). The coprocessor is a low-power processor configured to process data in a standby state. In some embodiments, a graphics processing unit (GPU) may be integrated into the processor 1901. The GPU is configured to be responsible for rendering and drawing content to be displayed on a display screen. In some embodiments, the processor 1901 may further include an artificial intelligence (AI) processor. The AI processor is configured to process computing operations related to machine learning.

The memory 1902 may include one or more computer-readable storage media. The computer-readable storage medium may be non-transient. The memory 1902 may further include a high-speed random access memory and a non-volatile memory, for example, one or more disk storage devices or flash storage devices. In some embodiments, the non-transitory computer-readable storage medium in the memory 1902 is configured to store at least one computer program, the at least one computer program being used for being executed by the processor 1901 to implement the displayed method for a virtual vehicle provided in the method embodiments of this disclosure.

In some embodiments, the terminal 1900 may include a display screen 1905 and a power supply 1909.

The display screen 1905 is configured to display a user interface (UI). The UI may include a graphic, a text, an icon, a video, and any combination thereof. When the display screen 1905 is a touch display screen, the display screen 1905 is further capable of acquiring a touch signal on or above a surface of the display screen 1905. The touch signal may be inputted to the processor 1901 as a control signal for processing. In this case, the display screen 1905 may be further configured to provide a virtual button and/or a virtual keyboard that are/is also referred to as a soft button and/or a soft keyboard.

The power supply 1909 is configured to supply power to components in the terminal 1900. The power supply 1909 may be an alternating current, a direct current, a primary battery, or a rechargeable battery.

A person skilled in the art may understand that the structure shown in FIG. 19 does not constitute a limitation on the terminal 1900, and the terminal may include more or fewer components than those shown in the figure, or some components may be combined, or a different component deployment may be used.

The computer device may further be implemented as a server. A structure of the server is described below.

FIG. 20 is a schematic structural diagram of a server according to an embodiment of this disclosure. A server 2000 may vary greatly because a configuration or performance varies, and may include one or more central processing units (CPU) 2001 and one or more memories 2002. The one or more memories 2002 store at least one computer program, and the at least one computer program is loaded and executed by the one or more processors 2001 to implement the methods provided in the foregoing various method embodiments. The server 2000 may further have a wired or wireless network interface, a keyboard, an input/output interface and other components to facilitate input/output. The server 2000 may further include other components for implementing device functions. Details are not described herein again.

In an exemplary embodiment, a computer-readable storage medium, such as a memory including a computer program, is further provided, and the computer program may be executed by a processor to complete the display method for a virtual vehicle in the foregoing embodiments. For example, the computer-readable storage medium may be a read-only memory (ROM), a random access memory (RAM), a compact disc read-only memory (CD-ROM), a magnetic tape, a floppy disk, an optical data storage device, or the like.

In an exemplary embodiment, a computer program product or a computer program is provided, the computer program product or the computer program including program code, the program code being stored in a computer-readable storage medium, a processor of a computer device reading the program code from the computer-readable storage medium, and the processor executing the program code to cause the computer device to perform the display method for a virtual vehicle.

In some embodiments, the computer program involved in the embodiments of this disclosure may be deployed to be executed on a computer device, or executed on a plurality of computer devices at the same location, or executed on a plurality of computer devices that are distributed at a plurality of locations and interconnected through a communication network, where the plurality of computer devices distributed at the plurality of locations and interconnected through the communication network may constitute a block-chain system.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely exemplary embodiments of this disclosure, and are not intended to limit this disclosure. Any modification, equivalent replacement, or improvement made within the spirit and principle of this disclosure shall fall within the scope of this disclosure.

What is claimed is:

1. A computer-implemented method for displaying a virtual vehicle in a virtual scene, the method comprising:
determining, by processing circuitry, whether a controlled virtual object has obtained each of a plurality of virtual parts required to synthesize the virtual vehicle;
in response to each of the plurality of virtual parts being determined as obtained by the controlled virtual object, displaying, by the processing circuitry on a display screen, a graphical element representing the virtual vehicle, the graphical element being displayed only when each of the plurality of virtual parts have been obtained by the controlled virtual object;
receiving, via a user interface of a terminal, a user interaction with the graphical element;
determining, based on the user interaction, a target display position for the virtual vehicle within the virtual scene; and
rendering, by the processing circuitry in the virtual scene, a model of the virtual vehicle at the target display position within the virtual scene.

2. The method according to claim 1, further comprising:
displaying a virtual parts interface that is configured to display each of the plurality of virtual parts of the virtual vehicle obtained by the controlled virtual object, wherein each of the plurality of virtual parts corresponds to a different type of virtual part.

3. The method according to claim 1, wherein the user interaction comprises one of:
a drag operation performed on the graphical element, and a click operation on the graphical element.

4. The method according to claim 3, further comprising:
displaying first prompt information in the virtual scene when the target display position is obstructed, the first prompt information indicating that the target display position is not valid.

5. The method according to claim 4, wherein the displaying the first prompt information comprises:
displaying a prompt graphic in a target color in the virtual scene when the target display position is obstructed, the prompt graphic corresponding to an outline of the virtual vehicle.

6. The method according to claim 3, wherein the determining the target display position of the virtual vehicle in the virtual scene comprises:
determining, based on the drag operation on the graphical element, an end position of the drag operation as the target display position of the virtual vehicle in the virtual scene.

7. The method according to claim 3, wherein the displaying the virtual vehicle at the target display position comprises:
controlling the virtual vehicle to fall from a sky of the virtual scene to the target display position.

8. The method according to claim 7, wherein the controlling the virtual vehicle to fall from the sky of the virtual scene comprises:
controlling the virtual vehicle to fall from the sky of the virtual scene to the target display position at a target movement speed that is based on a type of the virtual vehicle.

9. The method according to claim 7, wherein before the controlling the virtual vehicle to fall from the sky of the virtual scene, the method further comprises:
displaying virtual smoke at the target display position, the virtual smoke indicating the target display position.

10. The method according to claim 7, further comprising:
setting a state of another virtual object as being one of destroyed and defeated when the virtual vehicle contacts the other virtual object during a falling process.

11. The method according to claim 1, wherein the rendering comprises:
rendering the model of the virtual vehicle at the target display position when an unobstructed area at the target display position is greater than or equal to an area occupied by the virtual vehicle.

12. The method according to claim 1, further comprising:
displaying a virtual vending machine in the virtual scene, the virtual vending machine being configured to provide the plurality of virtual parts of the virtual vehicle;
displaying a virtual part selection interface in the virtual scene when the virtual vending machine is accessed by the controlled virtual object; and
determining, in response to a user selection of one of the plurality of virtual parts provided by the virtual vending machine, the selected virtual part as obtained by the controlled virtual object.

13. The method according to claim 12, wherein the determining the selected virtual part as obtained by the controlled virtual object comprises:
replacing, in response to the user selection of the one of the virtual parts, a virtual part previously obtained by the controlled virtual object of a same type as the selected virtual part with the selected virtual part.

14. The method according to claim 12, wherein after the selected virtual part is determined as obtained by the controlled virtual object, the method further comprises:

displaying second prompt information in response to a user selection of another one of the plurality of virtual parts provided by the virtual vending machine, the second prompt information indicating that an additional virtual part cannot be selected.

15. The method according to claim 1, further comprising:

displaying, based on a health value of another virtual object meeting a target health value condition, a plurality of virtual parts obtained by the other virtual object at a target drop position; and determining at least one virtual part of a first type from the plurality of virtual parts obtained by the other virtual object as the at least one virtual part obtained by the controlled virtual object when a distance between the controlled virtual object and the target drop position is within a second distance threshold, the first type of virtual part not having been obtained by the controlled virtual object.

16. The method according to claim 15, further comprising:

displaying a virtual part picking interface in the virtual scene when the distance between the controlled virtual object and the target drop position is within the second distance threshold, the virtual part picking interface including at least one virtual part of a second type, the second type of virtual part having been obtained by the controlled virtual object; and replacing, in response to a user selection of one of the at least one virtual part included in the virtual part picking interface, a virtual part of the second type previously obtained by the controlled virtual object with the selected virtual part of the at least one virtual part of the second type.

17. The method according to claim 1, further comprising:

displaying the graphical element in the virtual scene in response to a picking operation on a target prop; and displaying another virtual vehicle in the virtual scene in response to a user selection of the graphical element displayed in response to the picking operation, the other virtual vehicle corresponding to the target prop.

18. A display apparatus for displaying a virtual vehicle in a virtual scene, the display apparatus comprising:

processing circuitry configured to:

determine whether a controlled virtual object has obtained each of a plurality of virtual parts required to synthesize the virtual vehicle;

in response to each of the plurality of virtual parts being determined as obtained by the controlled virtual object, display, on a display screen, a graphical element representing the virtual vehicle, the graphical element being displayed only when each of the plurality of virtual parts have been obtained by the controlled virtual object;

receive, via a user interface of a terminal, a user interaction with the graphical element;

determine, based on the user interaction, a target display position for the virtual vehicle within the virtual scene; and render, in the virtual scene, a model of the virtual vehicle at the target display position within the virtual scene.

19. The display apparatus according to claim 18, wherein the processing circuitry is configured to display a virtual parts interface that is configured to display each of the plurality of virtual parts of the virtual vehicle obtained by the controlled virtual object, and each of the plurality of virtual parts corresponds to a different type of virtual part, and the user interaction comprises one of:

a drag operation performed on the graphical element, and a click operation on the graphical element.

20. A non-transitory computer-readable storage medium, storing instructions which when executed by a processor cause the processor to perform:

determining whether a controlled virtual object has obtained each of a plurality of virtual parts required to synthesize a virtual vehicle;

in response to each of the plurality of virtual parts being determined as obtained by the controlled virtual object, displaying, on a display screen, a graphical element representing the virtual vehicle, the graphical element being displayed only when each of the plurality of virtual parts have been obtained by the controlled virtual object;

receiving, via a user interface of a terminal, a user interaction with the graphical element;

determining, based on the user interaction, a target display position for the virtual vehicle within a virtual scene; and rendering, in the virtual scene, a model of the virtual vehicle at the target display position within the virtual scene.

* * * * *